United States Patent
Schutte et al.

(10) Patent No.: US 6,178,455 B1
(45) Date of Patent: *Jan. 23, 2001

(54) ROUTER WHICH DYNAMICALLY REQUESTS A SET OF LOGICAL NETWORK ADDRESSES AND ASSIGNS ADDRESSES IN THE SET TO HOSTS CONNECTED TO THE ROUTER

(75) Inventors: Mark E. Schutte, Sugarhill; Scott E. Hrastar, Duluth, both of GA (US)

(73) Assignee: Scientific-Atlanta, Inc., Norcross, GA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/843,056
(22) Filed: Apr. 11, 1997

Related U.S. Application Data

(60) Provisional application No. 60/035,618, filed on Jan. 17, 1997.

(51) Int. Cl.$^7$ .................................................. G06F 15/73
(52) U.S. Cl. ..................... 709/228; 709/226; 709/245
(58) Field of Search ........................ 370/401; 395/200.53, 395/200.68; 709/226, 245, 228

(56) References Cited

U.S. PATENT DOCUMENTS

| | | | |
|---|---|---|---|
| 3,985,962 | 10/1976 | Jones et al. | 370/455 |
| 4,186,380 | 1/1980 | Edwin et al. | 714/4 |
| 4,207,431 | 6/1980 | McVoy | 379/22 |
| 4,361,851 | 11/1982 | Asip et al. | 348/3 |
| 4,475,123 | 10/1984 | Dumbauld et al. | 380/211 |
| 4,491,983 | 1/1985 | Pinnow et al. | 359/118 |
| 4,528,589 | 7/1985 | Block et al. | 380/241 |
| 4,536,791 | 8/1985 | Campbell et al. | 348/5.5 |
| 4,577,224 | 3/1986 | Ost | 380/241 |
| 4,601,028 | 7/1986 | Huffman et al. | 370/217 |
| 4,633,462 | 12/1986 | Stifle et al. | 370/448 |
| 4,641,304 | 2/1987 | Raychaudhuri | 370/447 |
| 4,672,533 | 6/1987 | Nobel et al. | 340/825 |
| 4,757,460 | 7/1988 | Bione et al. | 709/248 |
| 4,771,391 | 9/1988 | Blasbalg | 709/232 |
| 4,804,248 | 2/1989 | Dumbauld et al. | 439/133 |
| 4,858,224 | 8/1989 | Nakano et al. | 370/217 |
| 4,907,224 | 3/1990 | Scoles et al. | 370/443 |
| 4,912,721 | 3/1990 | Pidgeon, Jr. et al. | 375/149 |
| 4,980,886 | 12/1990 | Berstein | 370/433 |
| 5,012,469 | 4/1991 | Sardana | 370/322 |
| 5,014,125 | 5/1991 | Pocock et al. | 348/7 |
| 5,050,213 | 9/1991 | Shear | 705/53 |
| 5,113,499 | 5/1992 | Ankey et al. | 340/875 |
| 5,131,041 | 7/1992 | Brunner et al. | 370/219 |
| 5,136,690 | 8/1992 | Becker et al. | 345/349 |
| 5,142,690 | 8/1992 | McMullan, Jr. et al. | 455/6.1 |

(List continued on next page.)

OTHER PUBLICATIONS

Cable Television Laboratories, Inc.; Data–Over–Cable Service Interface Specifications — Radio Frequency Interface Specification — SP–RFI–104–980724; 1997; pp. 1–196.

(List continued on next page.)

*Primary Examiner*—Kenneth S. Kim
(74) *Attorney, Agent, or Firm*—Kenneth M. Massaroni; Kelly A. Gardner; Hubert J. Barnhardt III

(57) ABSTRACT

The problem of wasting IP addresses by statically assigning them to hosts is solved as follows: when a cable router or RF modem becomes active, it sends a message requesting a set of IP addresses from the head end, which dynamically assigns the set of IP addresses and sends a message comprising the set of IP addresses to the cable router or RF modem. The cable router or RF modem then responds to requests by the hosts for IP addresses by assigning them IP addresses from the set. Furthermore, the set of IP addresses is released when the session terminates with the cable router or RF modem.

62 Claims, 10 Drawing Sheets

U.S. PATENT DOCUMENTS

| | | | |
|---|---|---|---|
| 5,155,590 | 10/1992 | Beyers, II et al. | 348/12 |
| 5,157,657 | 10/1992 | Potter et al. | 370/440 |
| 5,159,592 * | 10/1992 | Perkins | 370/338 |
| 5,166,930 | 11/1992 | Braff et al. | 370/235 |
| 5,166,931 * | 11/1992 | Riddle | 370/401 |
| 5,181,107 | 1/1992 | Rhoades | 348/13 |
| 5,185,860 | 11/1993 | Wu | 709/224 |
| 5,195,092 | 3/1993 | Wilson | 700/79 |
| 5,208,665 | 5/1993 | McCalley et al. | 348/12 |
| 5,214,390 | 5/1993 | Montreuil | 329/309 |
| 5,226,120 | 7/1993 | Brown et al. | 709/224 |
| 5,235,619 | 8/1993 | Beyers, II et al. | 375/200 |
| 5,239,540 | 8/1993 | Roviera et al. | 370/345 |
| 5,251,324 | 10/1993 | McMullan, Jr. | 455/2 |
| 5,261,044 | 11/1993 | Dev et al. | 345/357 |
| 5,271,041 | 12/1993 | Montreuil | 375/344 |
| 5,276,789 | 1/1994 | Besaw et al. | 345/440 |
| 5,278,833 | 1/1994 | Crisler et al. | 370/348 |
| 5,287,351 | 2/1994 | Wall, Jr. | 370/206 |
| 5,295,140 | 3/1994 | Crisler et al. | 370/443 |
| 5,295,244 | 3/1994 | Dev et al. | 345/357 |
| 5,303,234 | 4/1994 | Kou | 370/442 |
| 5,327,554 | 7/1994 | Palazzi III et al. | 348/13 |
| 5,333,183 | 7/1994 | Herbert | 379/112 |
| 5,347,304 | 9/1994 | Moura et al. | 348/2 |
| 5,361,259 | 11/1994 | Ahmadi et al. | 370/337 |
| 5,390,181 | 1/1995 | Campbell et al. | 370/444 |
| 5,404,505 | 2/1995 | Levinson | 707/10 |
| 5,423,003 | 6/1995 | Berteau | 370/254 |
| 5,423,006 | 6/1995 | Brown et al. | 710/19 |
| 5,436,909 | 7/1995 | Dev | 714/4 |
| 5,440,555 | 8/1995 | Momona | 370/455 |
| 5,471,399 | 11/1995 | Tanaka et al. | 716/11 |
| 5,473,599 | 12/1995 | Li et al. | 370/49 |
| 5,481,542 | 1/1996 | Logston et al. | 348/7 |
| 5,483,631 | 1/1996 | Nagi et al. | 345/329 |
| 5,504,921 | 4/1996 | Dev et al. | 709/223 |
| 5,515,361 | 5/1996 | Li et al. | 370/222 |
| 5,515,418 | 5/1996 | Yamaguchi et al. | 379/34 |
| 5,517,488 | 5/1996 | Miyazaki et al. | 370/449 |
| 5,517,502 | 5/1996 | Bestler et al. | 370/225 |
| 5,517,618 | 5/1996 | Wada et al. | 709/223 |
| 5,521,925 | 5/1996 | Merakos et al. | 370/337 |
| 5,533,108 | 7/1996 | Harris et al. | 379/201 |
| 5,534,913 | 7/1996 | Majeti et al. | 348/7 |
| 5,535,206 | 7/1996 | Bestler et al. | 370/458 |
| 5,535,403 | 7/1996 | Li et al. | 345/348 |
| 5,553,287 | 9/1996 | Bailey et al. | 709/221 |
| 5,572,640 | 11/1996 | Schettler | 345/440 |
| 5,586,121 | 12/1996 | Moura et al. | 370/404 |
| 5,594,798 | 1/1997 | Cox et al. | 380/257 |
| 5,595,997 | 1/1997 | Hamami | 370/228 |
| 5,604,528 | 2/1997 | Edwards et al. | 348/5.5 |
| 5,608,446 | 3/1997 | Carr et al. | 348/6 |
| 5,610,910 | 3/1997 | Focsaneaunu et al. | 370/390 |
| 5,612,959 | 3/1997 | Takase et al. | 370/390 |
| 5,644,706 | 7/1997 | Ruigrok et al. | 714/48 |
| 5,650,994 | 7/1997 | Daley | 370/259 |
| 5,654,746 | 8/1997 | McMullan, Jr et al. | 348/6 |
| 5,675,732 | 10/1997 | Majeti et al. | 709/235 |
| 5,701,465 | 12/1997 | Baugher et al. | 707/10 |
| 5,706,277 | 1/1998 | Klink | 370/220 |
| 5,708,655 * | 1/1998 | Toth et al. | 370/313 |
| 5,710,884 | 1/1998 | Dedrick | 709/217 |
| 5,712,897 | 1/1998 | Ortel | 379/22 |
| 5,720,025 | 2/1998 | Wilkes et al. | 714/6 |
| 5,721,780 | 2/1998 | Ensor et al. | 713/155 |
| 5,724,492 | 3/1998 | Matthews et al | 345/419 |
| 5,729,682 | 3/1998 | Marquis et al. | 709/229 |
| 5,737,311 | 4/1998 | Wyld | 370/227 |
| 5,737,316 | 4/1998 | Lee | 370/248 |
| 5,751,706 | 5/1998 | Land et al. | 370/352 |
| 5,751,707 | 5/1998 | Voit et al. | 370/384 |
| 5,751,971 * | 5/1998 | Dobbins et al. | 709/238 |
| 5,768,280 | 6/1998 | Way | 370/486 |
| 5,790,548 | 8/1998 | Sistanizadeh et al. | 370/401 |
| 5,790,806 | 8/1998 | Koperda | 709/202 |
| 5,793,753 | 8/1998 | Hershey et al. | 370/252 |
| 5,796,718 | 8/1998 | Caterisano | 370/217 |
| 5,799,002 | 8/1998 | Krishnan | 370/234 |
| 5,799,016 | 8/1998 | Onweller | 370/401 |
| 5,805,591 | 9/1998 | Naboulsi et al. | 370/395 |
| 5,805,596 | 9/1998 | Kranzler et al. | 370/445 |
| 5,808,671 | 9/1998 | Maycock et al. | 348/180 |
| 5,808,886 | 9/1998 | Suzuki | 700/4 |
| 5,812,819 * | 9/1998 | Rodwin et al. | 395/500.44 |
| 5,818,845 | 10/1998 | Moura et al. | 370/449 |
| 5,822,319 | 10/1998 | Nagami et al. | 370/392 |
| 5,828,655 | 10/1998 | Moura et al. | 370/236 |
| 5,828,666 | 10/1998 | Focsaneanu et al. | 370/389 |
| 5,835,696 | 11/1998 | Hess | 714/10 |
| 5,841,468 | 11/1998 | Wright | 348/6 |
| 5,845,091 | 12/1998 | Dunne et al. | 709/240 |
| 5,859,852 | 1/1999 | Moura et al. | 370/449 |
| 5,881,243 | 3/1999 | Zaumen et al. | 709/241 |
| 5,884,024 * | 3/1999 | Lim et al. | 713/201 |
| 5,884,284 | 3/1999 | Peters et al. | 705/30 |
| 5,892,812 | 4/1999 | Pester, III | 379/34 |
| 5,894,479 | 4/1999 | Mohammed | 370/401 |
| 5,903,572 | 5/1999 | Wright et al. | 370/524 |
| 5,905,714 | 5/1999 | Havansi | 370/242 |
| 5,966,163 | 10/1999 | Lin et al. | 348/12 |
| 5,999,970 | 12/1999 | Krisbergh | 709/217 |
| 6,018,767 | 1/2000 | Fijolek et al. | 709/218 |
| 6,028,860 | 2/2000 | Laubach | 370/395 |
| 6,032,266 | 2/2000 | Ichinoche et al. | 714/9 |
| 6,049,826 | 4/2000 | Beser | 709/222 |
| 6,052,819 | 4/2000 | Barker et al. | 714/776 |
| 6,055,224 | 4/2000 | King | 370/217 |
| 6,058,421 | 5/2000 | Fijolek et al. | 709/225 |
| 6,065,049 | 5/2000 | Beser et al. | 709/218 |
| 6,070,246 | 5/2000 | Beser | 713/201 |

OTHER PUBLICATIONS

R. Dome; Dynamic Host Configuation Protocol; Oct. 1993; pp. 1–39.

W. Richard Stevens; TCP/IP Illustrated, vol. 1, The Protocols; Chapters 1, 2, 3, 11, 16 (1994).

rfc 1541—*Dynamic Host Configuration Protocol*, R. Droms, Oct. 1993, found at URL http:/www.cis.o–hio–state.edu/htbin/rfc/rfc1541.html.

ATM: Foundation for Broadband Networks: vol. I , Second Edition, 1999, Uyless Black, Chapter 10.

Data Link Protocols, 1993, Uyless Black, Chapter 8.

Frame Relay Networks:Specifications and Implementations, 1996, Uyless Black, Chapter 10.

ISDN: Concepts, Facilities, and Services, Third Edition, 1997, Gary C. Kessler and Peter V. Southwick, Chapter 6.

ISDN and Broadband ISDN with Frame Relay and ATM, Fourth Edition, 1999, William Stallings, Chapter 8 and Chapter 12.

ISDN & SS7: Architectures for Digital Signaling Networks, 1997, Uyless Black, Chapter 3.

The V Series Recommendations: Standards for Data Communications over the Telephone Network, Second Edition, 1995, Appendix A.

Data–Over Cable Service Interface Specifications: Cable Modem to Customer Premise Equipment Interface Specification; SP–CMCI–12–980317; 1988; Cable Television Laboratories, Inc.; pp.1–40.

Data–Over Cable Service Interface Specifications; Cable Modem Telephony Return Interface Specification; SP–CMTRI–101–970804; 1997; Cable Television Laboratories, Inc.; pp.1–74.

Data–Over Cable Service Interface Specifications; Radio Frequency Interface Specification; SPRFIv1.1–101–990311; 1999; Cable Television Laboratories, Inc.; pp. 1–310.

Data–Over Cable Technical Reports; Operations Support System Framework for Data Over Cable Services; TR–DOCS–OSSIW08–961016; MCNS Holdings, LP; pp.1–20.

Data–Over Cable Service Interface Specifications; Operations Support System Interface Specification; SP–OSSI–102–990113; Cable Television Laboratories, Inc.; pp.1–26.

Data–Over Cable Service Interface Specifications; Operations Support System Interface Specification Radio Frequency Interface; SP–OSSI–RFI–I03–990113; Cable Television Laboratories, Inc.; pp. 1–29.

Data–Over Cable Service Interface Specifications; Operations Support System Interface Specification Baseline Privacy Interface MIB; SP–OSSI–BPI–I01–980331; 1997 & 1998; MCNS Holdings, LP; pp. 1–33.

Radio Frequency (RF) Interface Management Information Base for MCNS Complaint RF Interfaces Draft–ietf–Jipcdn–rf–interface–mib–04.txt; May 22, 1009; Guenter Roeck (editor); pp. 1–55.

Cable Device Management Information Base for MCNS Complaint Cable Modems and Cable Modem Termination Systems draft–ietf–ipcdn–cable–device–mib–04.txt; May 22, 1998; Guenter Roeck (editor); pp.1–32.

Baseline Privacy Interface Management Information Base for MCNS Complaint Cable Modems and Cable Modem Termination Systems; R. Woundy; Jan. 17,1999; pp.1–35.

Logical IP Subnetworks over IEE 802.14 Services; Mark Laubach; Mar. 13, 1998; pp. 1–13.

A Distribute Queueing Random Access Protocol for a broadcast Channel; Wenxin Xu and Graham Campbell; Illinois Institute of Technology (Comp. Science Dept.); pp.1–9.

CBR Channels on a DQRAP–based HFC Network; Chien–Ting Wu, Graham Campbell; Illinois Institute of Technology (Comp. Science Dept.); pp. 1–14.

Interleaved DQRAP with Global TQ; Chien–Ting Wu, Graham Campbel; Illinois Institute of Technology (Comp. Science Dept.); pp. 1–27.

The EXTENDED DQRAP (XDARAP) ALGORITHM; Chien–Ting Wu, Graham Campbell; Illinois Institute of Technology (Comp. Science Dept.); Dec. 9, 1994; pp.1–4.

Extended DQRAP (EXQRAP) A Cable TEV Protocol Functioning as a Distributed Switch; Chien–Ting Wu & Graham Campbell; Illinois Institute of Technology (Comp. Science Dept.); pp. 1–7.

A Review of Contention Resolution Algorithms for IEEE 802.14 Networks; Nada Glomie; Yves Saintillan, & David H. Su; National Institute of Standards and Technology; pp. 1–11.

A Review of Contention Resolution Algorithms for IEEE 802.14 Networks; Nada Glomie; Yves Saintillan, & David H. Su; National Institute of Standards and Technology; pp. 1–12.

On IEEE 802.14 Medium Access Control Protocol; Ying–Dar Lin; 1998; pp. 1–13.

On IEEE 802.14 Medium Access Control Protocol; Ying–Dar Lin; 1998; pp. 1–11.

On IEEE 802.14 Medium Access Control Protocol; Ying–Dar Lin; 1998; IEEE Communications Survey Fourth Quarter pp.2–10.

Hybrid–Fiber Coax; Hung Nguyen and Felix Yao; Apr. 22, 1996; pp. 1–11.

Cable Data Modem Performance Evaluation, A Primer for Non–Technical Readers; Cable Television Laboratories, Inc.;Nov. 15, 1996; pp. 1–8.

High Speed Cable Modems, Including IEEE 802.14 Standards; Albert A. Azzam; Chapters 5,6.

Cable Device Management Information Base for DOCSIS Complaint Cable Modems and Cable Modem Termination Systems; Michael St. Johns; Mar. 30, 1999; pp.1–54.

Radio Frequency (RF) Interfaces Management Information Base for MCNS/DOCSIS Compliant RF Interfaces; Mike St. Johns, (Editor); Feb. 17, 1999; pp. 1–67.

Telephony–Return Interface (TRI) Management Information Base for DOCSIS complaint Telephony–Return Cable Modems and Cable Modem Termination systems; S. Adiraju, J. Fijolek; Apr. 2, 1999; pp. 1–27.

Data Over Cable System Quality of Service Management Information Base (DOCSIS–QOS MIB); M. Patrick, J. Harvey, Motorola ING; Jun. 25, 1999, pp. 1–43.

Docsis 1.1 IGMP MIB; H. Abramson, Motorola; Jun. 1999; pp. 1–13.

Publications and Technical Reports of Dolors Sala–Home Page; pp.1–3.

Scheduling Disciplines for HFC Systems: What can we learn from ATM scheduling; Dolors Sala, John O. Limb; GA Tech; pp. 1–6.

A Protocol for Efficient Transfer of Data over Fiber/Cable Systems; Dolors Sala, John O. Limb; GA Tech; pp.1–8.

MAC Protocols for Multimedia Data over HFC Architecture; Dolors Sala Batlle; Nov. 27, 1995; pp. 1–28.

An Access Protocol to Support Multimedia Traffic Over Hybrid Fiber/Coax Systems; John O. Limb, Dolors Sala; pp.1–6.

Simulation of the Performance of XDQRAP under a Range of Conditions; John O. Limb, Dolors Sala, Json Collins, David Hartman, Daniel Howard; pp. 1–6.

Interleaved DQRAP with Global TQ; Chien–Ting Wu, Graham Campbell; Illinois Institute of Technology, CS Dept.; Jan. 8, 1995; pp.1–26.

Extended DQRAP (EXQRAP); Chien–Ting Wu, Graham Campbell; Illinois Institute of Technology, CS Dept.; Jan. 8, 1995; pp.1–4.

Cisco Hot Standby Router Protocol (HSRP); T. Li, . Cole, P. Morton. D. Li,; Mar. 98; pp. 1–17.

Address Allocation for Private Internets; Y. Rekhter, B. Moskowitz, D. Karrenberg, G. De Groot; Mar. 94; pp. 1–8.

Network 10 Considered Harmful; E. Lear, E. Fair, D. Crocker, T. Kessler; Jul. 94, pp. 1–8.

Unique Addresses are Good; E. Gerich; Jun. 95; pp. 1–3.

Address Allocation for Private Internets; Y. Rekhter, B. Moskowitz, D. KarrenbertG.J. De Groot, E. Lear; Feb. 96; pp. 1–9.

The IP Network Address Translator (NAT); K. Egevang, P. Francis; May 94; pp. 1–10.

IP Network Address Translator (NAT) Terminology and Considerations; P. Srisuresh, M. Holdrege; Aug. 99; pp. 1–30.

Load Sharing Using IP Network Address Translation (LSNAT); P. Srisuresh, D. Gan; Aug. 98; pp. 1–18.

DNS Extensions to Network Address Translators ($DNS_7$ ALG); P. Srisuresh, G. Tsirtsis, P. Akkiraju, A. Heffernan; Sep. 99; p. 29.

Security Model with Tunnel–Mode Ipsec for NAT Domains; P. Srisuresh; Oct. 99; pp. 1–11.

Network Address Translation–Protocol Translation (NAT–PT); G. Tsirtsis, P. Srisuresh; Feb. 2000; pp. 1–21.

Stateless IP/ICMP Translation Algorithm (SIIT); E. Nordmark; Feb. 2000; pp. 1–26.

FTB Extensions for IPv6 and NATs; M. Allman, S. Ostermann, C. Metz; Sep. 98; pp. 1–8.

* cited by examiner

| DEST. IPA | GATEWAY IPA | ROUTING INFO |
|---|---|---|
| LOOP BACK IPA 1103 | LOOP BACK IPA 1103 | |
| IPA FOR HOST 108 (0) 1109 | IPA FOR HOST 108 (0) 1111 | LAN 133 1105 |
| ⋮ | ⋮ | ⋮ |
| IPA FOR HOST 108 (N-1) | IPA FOR HOST 108 (N) | 1105 |
| DEFAULT 1115 | REUSABLE IPA FOR RF MODEM 106 (j) 117 | 1105 |

ROUTING TABLE 1101 FOR HOST 108 (K)

| IP ADDR. | LAN A |
|---|---|
| IPA FOR HOST 108 (0) 1121 (0) | LAN A FOR HOST 108 (0) 1123 (0) |
| ⋮ | ⋮ |
| 1121 (N-1) | 1123 (N-1) |
| REUSABLE IP ADDR. 1117 | LAN A FOR RF MODEM 106(j) 1125 |

ARP CACHE FOR HOST 108 (K)

FIG - 11

ROUTER WHICH DYNAMICALLY REQUESTS A SET OF LOGICAL NETWORK ADDRESSES AND ASSIGNS ADDRESSES IN THE SET TO HOSTS CONNECTED TO THE ROUTER

CROSS REFERENCE TO RELATED APPLICATIONS

This application claims the benefit of U.S. Provisional Application Ser. No. 60/035,618, titled *Cable Data Network System*, filed Jan. 17, 1997 with Scott Hrastar, Mark E. Schutte, Roy A. Bowcutt, David A. Sedacca, and Todd A. Merrill listed as inventors. This application also cross-references the following related Applications:

U.S. application Ser. No. 08/833,198, titled *Apparatus and Methods for Automatically Rerouting Packets in the Event of a Link Failure*, filed Apr. 14, 1997, with Scott E. Hrastar, Todd A. Merrill, and Roy A. Bowcutt listed as inventors;

U.S. application Ser. No. 08/837,073, titled *Method of Using Routing Protocols to Reroute Packets during a Link Failure*, filed Apr. 11, 1997, with Scott E. Hrastar, Todd A. Merrill, and Roy A. Bowcutt listed as inventors;

U.S. application Ser. No. 08/843,061, titled *Methods for Dynamically Assigning Link Addresses and Logical Network Addresses*, filed Apr. 11, 1997, with Scott E. Hrastar and George Horkan Smith listed as inventors;

U.S. application Ser. No. 08/838,833, titled *Router for Use with a Link that has a Set of Concurrent Channels*, filed Apr. 11, 1997, with Todd A. Merrill, Mark E. Schutte, Roy A. Bowcutt, and Scott E. Hrastar listed as inventors;

U.S. application Ser. No. 08/832,714, titled *Method of Dynamically Assigning a Logical Network Address and a Link Address*, filed Apr. 11, 1997, with Scott E. Hrastar and David A. Sedacca listed as inventors;

U.S. application Ser. No. 08/840,304, titled *Router for which a Logical Network Address which is not Unique to the Router is the Gateway Address in Default Routing Table Entries*, filed Apr. 11, 1997, with Scott E. Hrastar and George Horkan Smith listed as inventors;

U.S. Application Ser. No. 08/835,917, titled *Usage Statistics Collection for a Cable Data Delivery System*, filed Apr. 10, 1997, with Roy A. Bowcutt and Scott E. Hrastar listed as inventors;

U.S. application Ser. No. 08/835,916, titled *Two-Tiered Authorization And Authentication For A Cable Data Delivery System*, filed Apr. 10, 1997, with Scott E. Hrastar and Roy A. Bowcutt listed as inventors; and U.S. application Ser. No. 08/835,966, titled *System and Method for Detecting, Correcting and Discarding Corrupted Data Packets in a Cable Data Delivery System*, filed Apr. 11, 1997, with James E. Barker, Roy A. Bowcutt, Scott E. Hrastar, Todd A. Merrill, and David A. Sedacca listed as inventors.

BACKGROUND OF THE INVENTION

1. Field of the Invention

The invention concerns data networks generally and more particularly concerns data networks that employ protocols belonging to the TCP/IP protocol suite and data networks that are asymmetric, that is, data networks in which there is more capacity to move data in one direction than there is in the reverse direction.

2. Description of the Prior Art

In the not-too-distant past, images could be processed and displayed only by large, special-purpose computer systems. Owners of lower-cost and less-powerful computers such as personal computers had to content themselves with character-based displays. The cost of memory has dropped so quickly and the power of microprocessors has increased so greatly in recent years, however, that modern personal computers are completely capable of processing and displaying images. Indeed, modem graphical user interfaces depend to a large extent on this capability.

Frustratingly enough for users of personal computers, the old problems with images have returned in another area, namely network computing. In network computing, the personal computer or work station is connected to a network and is able to use the network to fetch the data it is processing from remote locations. The most recent development in network computing is the Internet, a world-wide logical network which permits anyone who has access to the Internet to interactively fetch data including images from just about anywhere in the world. For example, using the Internet, it is possible to fetch pictures of the latest restoration projects in Florence, Italy from that city's home page on the World Wide Web.

The main drawback to interactively fetching data on the Internet is the length of time it takes to retrieve and display images. The problem is so serious that many people set up the program they use to access the Internet so that it does not fetch images. Doing this restricts the user to character data, but greatly decreases the time it takes to access information. The bottleneck in retrieving images from the Internet is not the personal computer, but rather the lack of capacity or bandwidth of the networks over which the images must be fetched. One part of the network where bandwidth is particularly restricted is the analog telephone line that connects most PC users to the Internet. It has been known for years that the bandwidth of the telephone system can be increased by replacing the analog system with a digital system, but all of the known techniques for doing this require extensive modification of the telephone system.

A great many homes do in fact have a high bandwidth connection, namely that provided by cable television. The problem with this connection is that it is one way. A PC may receive data via a home's CATV cable, but it cannot use the cable to send data. Again, ways of making the CATV system bidirectional have been known for years. For example, in the early 1980's, Scientific-Atlanta, Inc. introduced and marketed a product known as the Model 6404 Broadband Data Modem for use with bidirectional CATV systems. Scientific-Atlanta, Inc. has also recently filed U.S. patent applications Ser. Nos. 08/627,062, filed Apr. 3, 1996, now issued U.S. Pat. No. 5,790,806, and U.S. patent application Ser. No. 08/732,668, filed Oct. 16, 1996, now issued U.S. Pat. No. 5,966,163, and a continuation-in-part titled *System and Method for Providing Statistics for Flexible Billing in a Cable Environment*, Koperda, et al., filed Mar. 14, 1997 which describe bidirectional CATV systems. As with the telephone systems, the problem here is not the technology, but the fact that its introduction requires extensive modification of most existing CATV systems.

Given that many homes have a CATV cable and virtually all homes have an analog telephone line, systems have been proposed in which the CATV cable is used to send data from the Internet to the PC and the telephone line used to return data from the PC to the Internet. These systems take advantage of the fact that by far the most common pattern of interaction between users and networks is for the user to retrieve a large amount of data over the network, for example an image of a restored art work from Florence, examine the image, and then send a few keystrokes over the network. With this kind of interaction, far less bandwidth is needed in the channel that is used to return the keystrokes than in the channel that is used to fetch the image.

An example of such a system is the one disclosed in Moura, et al., *Asymmetric Hybrid Access System and Method,* U.S. Pat. No. 5,586,121, issued Dec. 17, 1996, and in Moura, et al., *Remote Link Adapter for use in TV Broadcast Data Transmission System,* U.S. Pat. No. 5,347,304, issued Sep. 13, 1994, In this system, the head end of a cable system has high bandwidth access to the Internet or to other networks and access via CATV cables and the telephone system to households or businesses with PCs. Data received from these networks is sent to PCs connected to the cable system's cables and responses from the PCs are collected via the telephone system and sent to the network. In the home or business, the PC is connected either directly or via a local area network to a device which includes both a radio frequency modem and a standard analog telephone modem. The radio frequency modem is connected to the CATV cable. It receives and decodes the data sent on the CATV cable and provides it to the PC. The telephone modem is connected to a standard telephone line. It receives data from the PC and sends it to the CATV head end, which in turn forwards it to the Internet or other networks.

While systems such as the one disclosed in the Moura references do provide a solution to the bandwidth problem, they have a number of deficiencies, particularly when used in the context of the Internet. Among the deficiencies are the following:

The system of Moura wastes Internet Protocol (IP) addresses for the computers attached to the modem. IP addresses are in short supply. In the system of Moura, however, IP addresses are statically assigned to the PCs and are consequently not available for reuse when a PC is idle or not engaged in an activity which involves network access.

From the point of view of the Internet, the system of Moura is a link level system, that is, the components of the system of Moura do not themselves have IP addresses and cannot themselves execute IP protocols. In particular, IP routing is not used within the system of Moura. One difficulty arising from this situation is that IP routing is centralized in the IP router that connects the head end to the Internet; another is that the modem in the system of Moura cannot function as an IP router.

In Moura, the telephone connection to the modem is used solely to transfer data from the PC and modem to the head end. All data received by the PC and modem is sent via the CATV cable. Consequently, when the CATV system fails, the PC is left without a connection by which it can receive data. This situation is made even less desirable by the fact that CATV systems are far more likely to fail than the telephone system.

The CATV channel to which the modem of Moura responds is statically assigned to a given modem, thereby rendering the channel unavailable for use by other modems when the PC connected to the given modem is idle or is not engaged in an activity which involves network access.

It is an object of the system disclosed herein to overcome the preceding and other deficiencies of systems like that of Moura.

SUMMARY OF THE INVENTION

The problem of wasting IP addresses by statically assigning them to hosts is solved as follows: when the cable router becomes active, it sends a message requesting a set of IP addresses via the telephone line to the head end, which dynamically assigns the set of IP addresses and sends a message containing the set of IP addresses via the telephone line to the cable router. The cable router then responds to requests by the hosts for IP addresses by assigning them IP addresses from the set.

Other objects and advantages of the invention will be apparent to those skilled in the arts to which the invention pertains upon perusing the following Detailed Description and Drawing, wherein:

BRIEF DESCRIPTION OF THE DRAWING

FIG. 11 is a diagram of a routing table and an ARP cache for a host 108.

Figure 1:
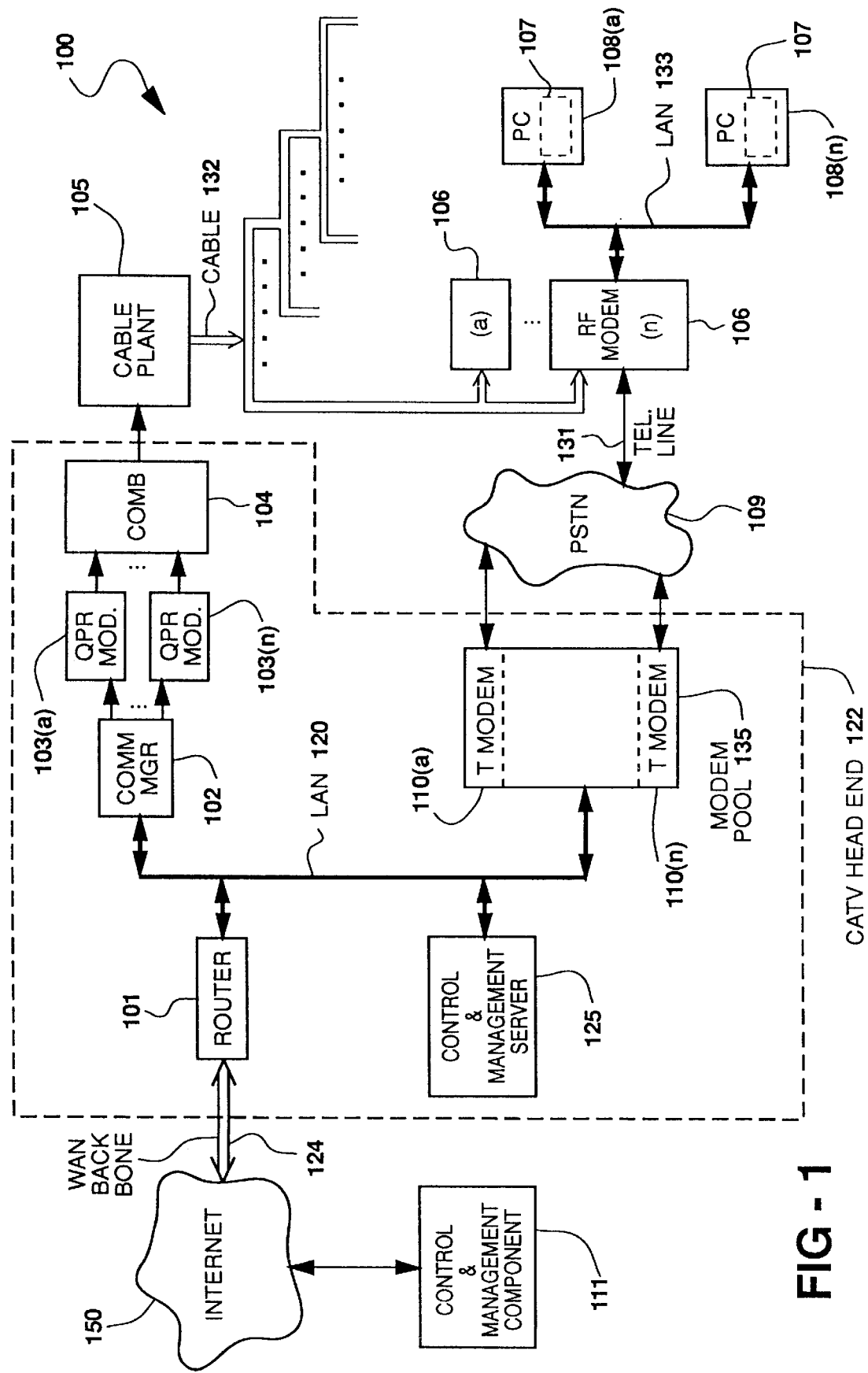
FIG. 1 is an overview of the physical components of the cable data network disclosed herein.

The reference numbers in the drawings have at least three digits. The two rightmost digits are reference numbers within a figure; the digits to the left of those digits are the number of the figure in which the item identified by the reference number first appears. For example, an item with reference number 203 first appears in FIG. 2.

Detailed Description

The following Detailed Description will begin with an overview of Internet protocol packets (datagrans) and of the IP addressing architecture employed in the cable data network of the preferred embodiment and will then describe the physical components of the cable data network of the preferred embodiment. Thereupon the discussion will show how IP addresses are mapped onto these components, how IP addresses are assigned to the components, and how routing of IP packets may be dynamically changed in response to failure of an RF link.

Figure 3:
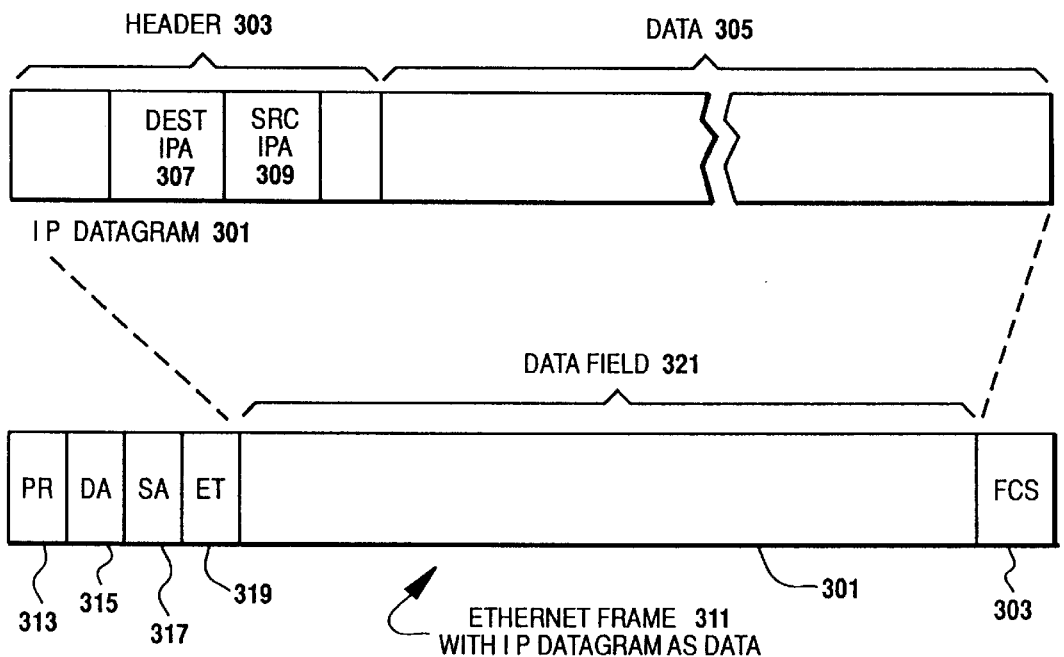
FIG. 3 shows an IP datagram and an Ethernet frame as they are employed in a preferred embodiment.

Internet Protocol Packets (data grams): FIG. 3

FIG. 3 shows those parts of an Internet protocol (IP) packet or datagram 301 that are required to understand the following discussion. An IP packet 301 has two main parts, header 303, which carries control information about the packet, and data 305, which is the data being transported in the packet. Header 303 has a fixed format and length, while data 305 may have a varying length. All that need be known about the contents of header 303 for the present discussion is that it contains two 32-bit Internet Protocol (IP) addresses, one of which, DEST IPA 307 specifies a destination in the Internet to which IP packet 301 is to be delivered, and the other of which, SRC IPA 309, specifies the source in the Internet of packet 301. Sources and destinations of Internet packets 301 are termed herein Internet hosts. An Internet host is an entity in a network which has an IP address and which is capable of responding to at least some of the protocols in the TCP/IP protocol suite. For details on IP addressing and the protocols of the TCP/IP protocol suite, see W. Richard Stevens, *TCP/IP Illustrated: The Protocols,* Addison-Wesley, 1994, which is hereby incorporated by reference into this patent application.

The Internet is a logical network, not a physical network. Internet packets 301 are transported across a variety of different physical networks. While an Internet packet 301 is in a given physical network, it is transported in the same fashion that the physical network transports any kind of data. For example, one common kind of physical network is a LAN that uses the 10 base T protocol. One example of such a LAN is a LAN that uses the Ethernet® protocol developed by Xerox Corporation. In the Ethernet protocol, data moves in packets called frames. Each frame has a preamble 313, a destination Ethernet address 315, a source Ethernet address 317, an ethertype field, which specifies a type of the protocol, a data field 321, which carries the data, and a frame check sequence 323, which is an error checking code. When an Ethernet frame 311 is carrying an IP datagram 301, IP datagram 301 simply occupies data field 321. It is worth pointing out here that the Ethernet protocol does not examine the contents of IP datagram 301. There may of course be many levels of protocols between an IP datagram 301 and the physical medium upon which the IP datagram is being transported. In the following, only the next level down from the IP level is of concern, and this level is termed generically the link level, with the addresses at that level being termed link addresses. Thus, if the link level employs the Ethernet protocol, the link addresses are DA 315 and SA 317.

The IP Addressing and Routing Architecture

The architecture for IP addressing and routing in the cable data network defines how the IP addresses which are used to route Internet protocol packets (datagrams) in the Internet are mapped onto the networks which make up the cable data network's link level. The architecture has a number of fundamental principles:

Each cable data network defines its own IP addressing domain, i.e., the network defines how IP addresses in a set of IP addresses which has been assigned to the cable data network are assigned to component devices in the cable data network.

All devices in the cable data network which do routing or maintain data bases used in determining routes are IP hosts.

Within the addressing domain, sets of IP addresses are assigned to hosts connected by a LAN to an RF modem, which is in turn connected to a CATV cable that is part of a network in the addressing domain. The RF modem functions as a router for packets addressed to the hosts connected to the LAN.

IP routing in the networks consisting of portions of the cable network is hierarchical. An IP packet addressed to a host is first routed to the proper cable network, then captured by the host's RF modem and finally routed to the host by the RF modem.

The RF modem may receive IP packets addressed to its hosts from two independent link level networks: an RF link level network (for example, a CATV network) and a switched public telephone network. The RF modem may further route outgoing IP packets via the switched public telephone network.

Several advantages flow from these principles:

Because all of the devices that do routing or maintain routing data bases are Internet hosts, IP address assignment, packet rerouting, and network management can be done using the standard DHCP, RIP, and SNMP TCP/IP protocols. For details, see the Stevens reference, supra.

Because the RF modem can receive packets addressed to its hosts not only via the RF link level, but also via the telephone network, if the RF link fails, packets for the hosts can be simply rerouted to the RF modem via the telephone network. Moreover, the rerouting can by done by means of the RIP TCP/IP protocol.

Packets sent to the RF modem via the telephone network may be employed to tune the RF modem to a particular channel in the RF link, making it possible to dynamically assign a channel in the RF link to an RF modem. In effect, a link-level address in the RF link is dynamically assigned to the RF modem.

Because the cable data network can assign its own IP addresses, a mixed static-dynamic policy for assigning addresses may be pursued, with components that are constantly active having statically-assigned IP addresses and components that are intermittently active, such as the RF modems and the hosts attached to them, having dynamically-assigned IP addresses that are assigned at the beginning of activity by the component and are deassigned at the end of activity.

The dynamic assignment of IP addresses to RF modems and their hosts makes it possible to share a small number of IP addresses among a much larger group of users. Moreover, the dynamic assignment of IP addresses can by done by means of the DHCP TCP/IP protocol.

The dynamic assignment of IP addresses to RF modems also makes it possible to share a small number of addresses in the RF link among a much larger group of RF modems.

Network management can be done by means of the SNMP TCP/IP protocol.

The number of IP addresses required in the network is further reduced by giving the RF modems a reusable IP address for use inside the LAN to which a given RF modem's hosts are attached.

Physical Components of the Cable Data Network: FIG. 1

FIG. 1 shows the physical components of cable data network 100 in a preferred embodiment. Cable data network 100 transfers data packets with IP addresses between Internet 150 and hosts 108, which in a preferred embodiment are PCs or work stations. Cable data network (CDN) 100 also transfers packets with IP addresses among the components of cable data network 100 and uses Internet 150 to exchange data packets with IP addresses between cable data network 100 and remotely-located control and management components 111. These components typically deal with functions such as receiving information about new subscribers or billing.

In a preferred embodiment, cable data network 100 is implemented in a cable television (CATV) system. Packets from Internet 150 that contain the IP address of a host 108(*i*) are received in CATV head end 122, are put in the proper form for transmittal over cable 132 belonging to the CATV system, and are transmitted via cable 132 to RF modem 106(*j*) to which destination host 108(*i*) is attached. RF modem 106(*j*) reads the IP address of host 108 from the packet and routes the packet to host 108(*i*). Packets from host 108(*i*) which are intended for a destination in Internet 150 go to RF modem 106(*j*), which routes them via telephone line 131 and public switched telephone network (PSTN) 109 to a telephone modem (Tmodem) 110(*k*) in telephone modem pool 135 in head end 122. Tmodem 110(*k*) routes the packet to router 101, which routes it to Internet 150. Since public switched telephone network 109 allows bidirectional communication, router 101 may also route packets received from Internet 150 for host 108(*i*) to host 108(*i*) via Tmodem 110(*k*) and RF modem 106(*j*). As will be explained in more detail in the following, this route is used in the event of a failure in the CATV portion of network 100.

Continuing with the details of the implementation of cable data network 100, data packets are transferred between Internet 150 and CATV head end 122 by means of a transmission medium belonging to a wide-area network (WAN) backbone 124. Typically, the transmission medium will be a high-speed, high-capacity fiber optic cable such as a T1 or T3 cable, but it could also be a terrestrial or satellite microwave link. The transmission medium is connected to router 101, which in a preferred embodiment may be a router belonging to the 7000 series manufactured by Cisco Systems, Inc., San Jose, Calif.

Router 101 is coupled between WAN backbone 124 and local-area network (LAN) 120, which is the link-level network that connects the components of cable data network 100 which are located in CATV head end 122. Router 101 may both receive packets from WAN backbone 124 or LAN 120 and provide them to WAN backbone 124 or LAN 120. Each component connected to LAN 120 has both an IP address and a LAN address on LAN 120, and router 101 contains a routing table which it uses to route IP packets to IP hosts, including other routers. Router 101 examines every packet it receives on WAN backbone 124 or LAN 120; if the packet's destination IP address is one of the ones in the routing table, router 101 routes it to the component on LAN 120 which is to receive IP packets having that address; if it is not one of the addresses in the routing table, router 101 routes it to WAN backbone 124, which takes it to Internet 150. In each case, router 101 puts the data packet into the proper form to be transmitted via the relevant link-level network.

As will be apparent from the foregoing discussion, LAN 120 and router 101 can be used to route IP packets received from Internet 150 and destined to a host 108 via two routes. The first is via communications manager 102 and cable plant 105, cable 132, and RF modem 106. The second is to host 108 via telephone modem pool 135 and RF modem 106. Packets from host 108 and from RF modem 106 go via telephone modem pool 135 and LAN 120 to router 101. In other embodiments, it may also be possible to route packets addressed to RF modem 106 via the first route. Router 101 can finally route packets via Internet 150 between the components in head end 122, hosts 108, RF modems 106, and control and management component 111.

Figure 4:
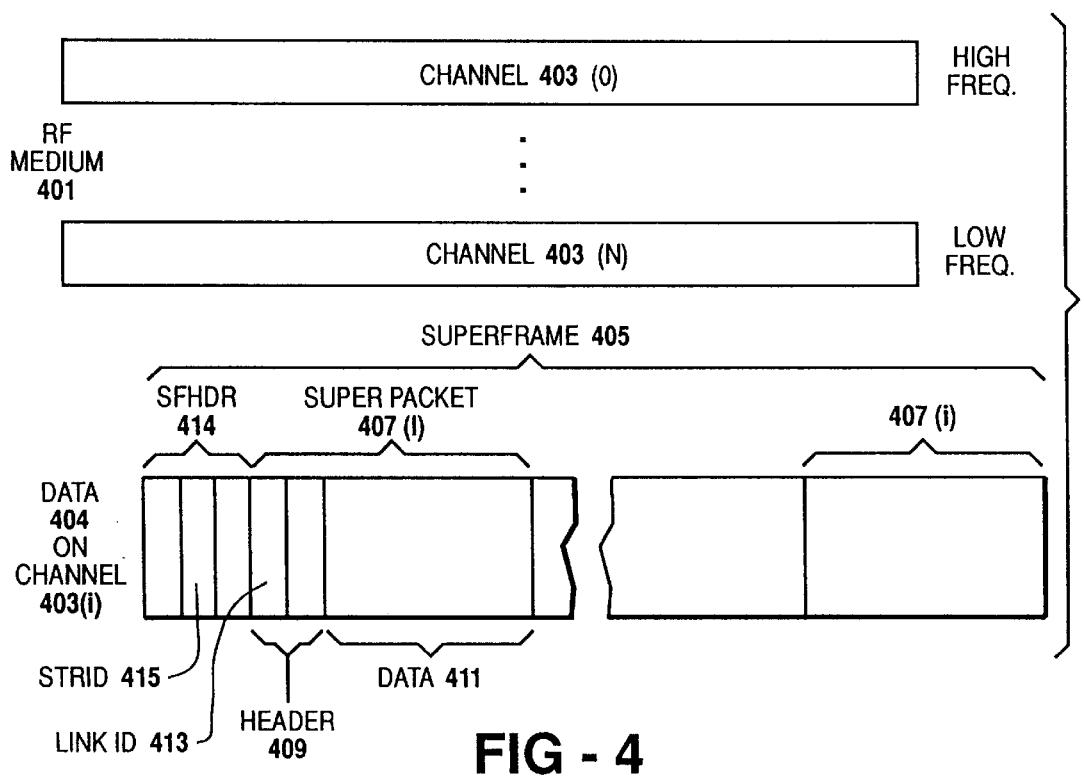
FIG. 4 shows the channels, superframes, and superpackets used to carry data on the RF link in the preferred embodiment.

When packets are to go to a host 108 via cable 132, they are routed to communications manager 102, which puts the packets into the proper form for transport by that link-level network. FIG. 4 shows how data is transported on cable 132 in a preferred embodiment. Cable 132 is an RF medium 401 which carries data in a fixed number of channels 403. Each channel 403 occupies a portion of the range of frequencies transported by cable 132. Within a channel 403(*i*), data moves in superframes 405. Each superframe contains a superframe header 414 and a fixed number of fixed-sized superpackets 407. The only portion of the superframe header that is important to the present discussion is stream identifier (STRID) 415, which is a unique identifier for the stream of data carried on channel 403. The combination of a channel's frequency and the stream identifier 415 uniquely identifies the network to which cable 132 belongs in the CATV system. As will be explained in more detail later, this unique identification of the network cable 132 belongs to is used by communications manager 102 to determine which network should receive the IP packets intended for hosts 108 connected to a given RF modem 106(*i*).

Each superpacket 407 contains a header 409 and data 411. The header contains a link identifier (LinkID) 413 in cable network 132 for an RF modem 106. The number of superpackets 407 is the number of pipes in channel 403(*i*). When a given RF modem 106(*i*) is active, it is associated with a <channel,pipe,link ID> triple, that is, the RF modem 106(*i*) is tuned to the channel 403(*j*) specified in the triple and watches the superpackets that belong to the pipe specified in the triple. For example, if the RF modem is associated with pipe 3, it watches superpacket 407(3) in superframe 405, and if superpacket 407(3)'s header 409 contains RF modem 106(*i*)'s Link Id 413, RF modem 106(*i*) reads data 411 from superpacket 407(3). The <channel,pipe,linkID> triple is thus the link address of RF modem 106(*i*) on cable 132. Data 411 is of course all or part of an IP packet 301. If the IP address of packet 301 specifies a host 108 connected to RF modem 106(*i*), RF modem 106(*i*) routes it to that host 108.

Returning to communications manager 102, that component receives IP packets 301 addressed to hosts 108 connected to networks whose link layers are cables 132 connected to head end 105 and routes them to the proper RF modems 106 for the hosts. It does so by relating the IP address of an active host 108 to one of the networks and within the network to a <channel,pipe,linkID> triple specifying the RF modem 106 to which the host 108 is connected. As employed in the present context, an active host is one that currently has an IP address assigned to it. Using the information in the routing table, communications manager 102 makes superframes 405 for each channel 403(*i*) in the network containing cable 132. The superframes contain superpackets 407 directed to the RF modems 106 connected to that channel for which communications manager 102 has received IP packets 301. The superframes are stored in a dual-ported memory which is accessible to Quadrature Partial Response (QPR) modulators 103.

There is a QPR modulator 103 for each channel 403 in a given network, and the QPR modulator reads the superframes for its channel, digitally modulates the RF signal for the channel according to the contents of the superframes, and outputs the modulated signal to combiner 104, which combines the outputs from all QPR modulators and provides the combined output to cable plant 105, which outputs it to cables 132 belonging to the network. The QPR modulators employ quadrature partial response modulation. Of course, any kind of digital RF frequency modulation could be employed as well. It should also be pointed out that any arrangement could be employed which relates a given RF modem 106 to a portion of the bandwidth of the network to which cable 132 belongs, rather than the <channel,pipe,LinkID> triple used in the preferred embodiment, and that the portion of the bandwidth that carries packets addressed to hosts 108 connected to a given RF modem 106 can be termed in a broad sense the RF modem's "channel".

Figure 5:
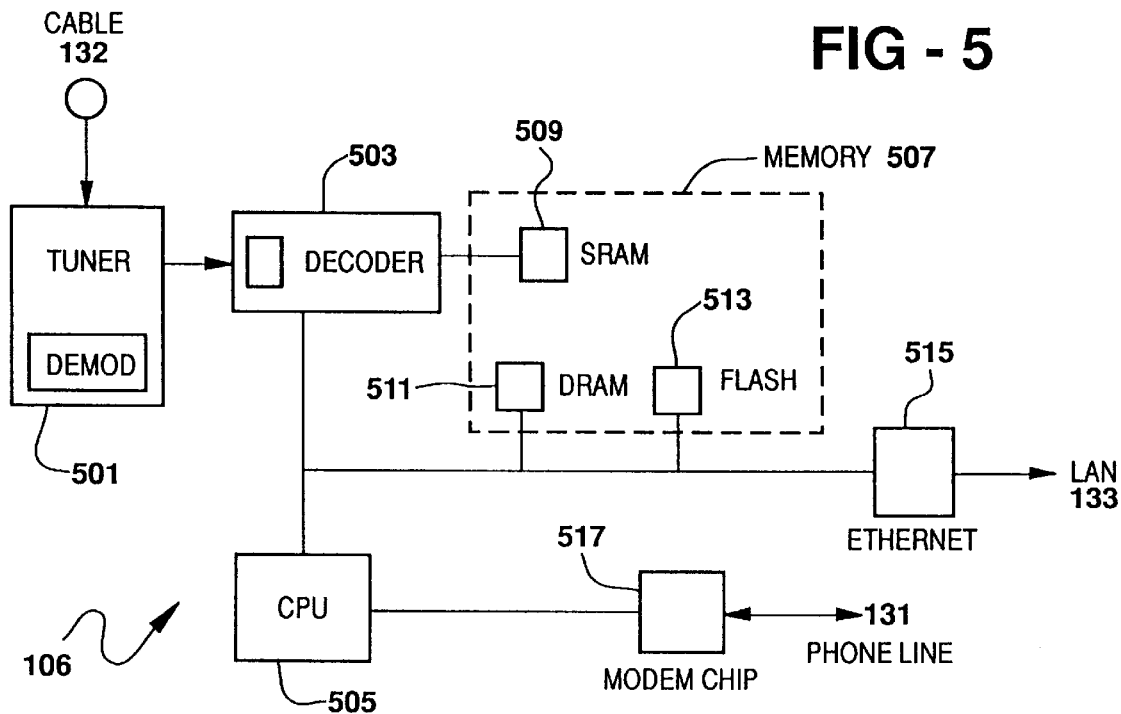
FIG. 5 is a block diagram of a preferred embodiment of the RF (radio frequency) modem employed in the cable data network.

Following cable 132 to RF modem 106, RF modem 106 is connected between cable 132, a LAN 133 to which one or more hosts 108 are connected, and telephone line 131 and provides interfaces to cable 132, LAN 133, and telephone line 131. FIG. 5 shows a block diagram of a preferred embodiment of RF modem 106. The components of RF modem 106 operate under control of CPU 505 and read data from and write data to memory 507, which has three kinds of memory components: static RAM 509, which is nonvolatile, that is, it is writable but retains its contents when RF modem 106 is turned off, dynamic RAM 511, which is volatile, and FLASH RAM 513, which is nonvolatile and writable but will only permit a fixed number of writes. SRAM 509 is used to store data which changes but must be kept across activations of RF modem 106. Examples of such data are the RF modem's telephone number and the addresses of RF modem 106 and hosts 108 on LAN 133. DRAM 511 is used for data that is only valid during an activation, such as the current routing table. FLASH RAM 513 is used for information that changes only rarely, such as the programs executed by CPU 505. In the preferred embodiment, RF modem 106 can load programs it receives in IP packets via telephone line 131 into Flash RAM 513.

Turning to the interfaces and beginning with the interface to cable 132, that interface has two main components, tuner 501 and decoder 503. Tuner 501 can be tuned under control of CPU 505 to a channel 403(*i*) in cable 132. Tuner 501 further demodulates the superframes 405 it receives on that channel and passes them to decoder 503. Decoder 503 examines superpacket 407(*i*) for the pipe which carries data addressed to RE modem 106, and if LinkID 413 in superpacket 407(*i*) specifies RF modem 106, decoder 503 does error correction, decodes the data, and passes it to memory 507. When an IP packet has accumulated in memory 507, CPU 505 examines the destination IP address in the packet, and uses a routing table in memory 507 to determine whether the packet is addressed to a host 108 connected to RF modem 106. If the packet is so addressed, CPU 505 obtains the LAN address corresponding to the IP address. CPU 505 provides the LAN address and the location of the packet in memory 507 to Ethernet integrated circuit 515, which packages the packet into one or more Ethernet frames and outputs it to LAN 133 which is an Ethernet link.

RF modem 106 may also receive IP packets via phone line 131 and modem chip 517 that are addressed either to the RF modem 106 itself or to one of the hosts 108 connected to RF modem 106. In the first case, RF modem 106 responds to the packet; in the second, it routes the packet to the host as just described for packets from cable 132. When RF modem 106 receives a packet via LAN 133 that is not addressed to RF modem 106 itself, it routes the packet via modem chip 517 and telephone line 131. Included in host 108 is the software 107 necessary to interact with RF modem 106.

Continuing with the portion of the link level that is implemented using the public switched telephone network, modem chip 517 in RF modem 106 is connected by means of a standard analog telephone line 131 to public switched telephone network 109, and RF modem 106 can thus call other telephone numbers via PSTN 109 and be called from other telephone numbers in PSTN 109. In the present case, when RF modem 106 wishes to set up a session that will permit it to transfer IP packets 301 for a host 108, it calls a telephone number for telephone modem pool 135. The modem pool 135 responds by assigning a telephone modem (Tmodem) 110 to RF modem 106 and assigning RF modem 106 an IP address. As shown in FIG. 1, telephone modem pool 135 is also connected to LAN 120 in head end 122. Telephone modem pool 135 serves as a router with respect to LAN 120 and the telephone connections currently being served as by the Tmodems 110 in the modem pool. Once a telephone modem 110 and an IP address have been assigned to RF modem 106, RF modem 106 may send IP packets 301 to the devices connected to LAN 120 and receive IP packets 301 from those devices.

As will be explained in more detail in the following, the fact that PSTN 109 provides a bi-directional link between the devices connected to LAN 120 and RF modem 106 is employed to determine where RF modem 106 is in the cable network managed by head end 122, to dynamically assign a <channel,pipe,linkID> triple in cable 132 to RF modem 106, and to provide an alternate route to hosts 108 connected to RF modem 106 when there is a failure in the RF link between head end 122 and RF modem 106.

The remaining device which is connected to LAN 120 is control/management server 125, which in a preferred embodiment is implemented in software executing on a server constructed by SUN Microsystems, Inc., Mountain View, Calif. Control/management server 125 manages CDN 100. It responds to DHCP packets by dynamically allocating IP addresses to hosts 108 and sending SNMP packets to router 101 and communications manager 102 which cause them to set their routing tables as required for the newly-assigned IP address, responds to SNMP trap packets from the devices connected to LAN 120 and from RF modems 106, responds to RIP packets as required to update routings, and maintains the Management Information Database used by the SNMP protocol as well as a list of unassigned IP addresses. A graphical user interface in control/management server 125 shows the current status of CDN 100 and permits operator intervention in the operation of cable data network 100.

Figure 2:
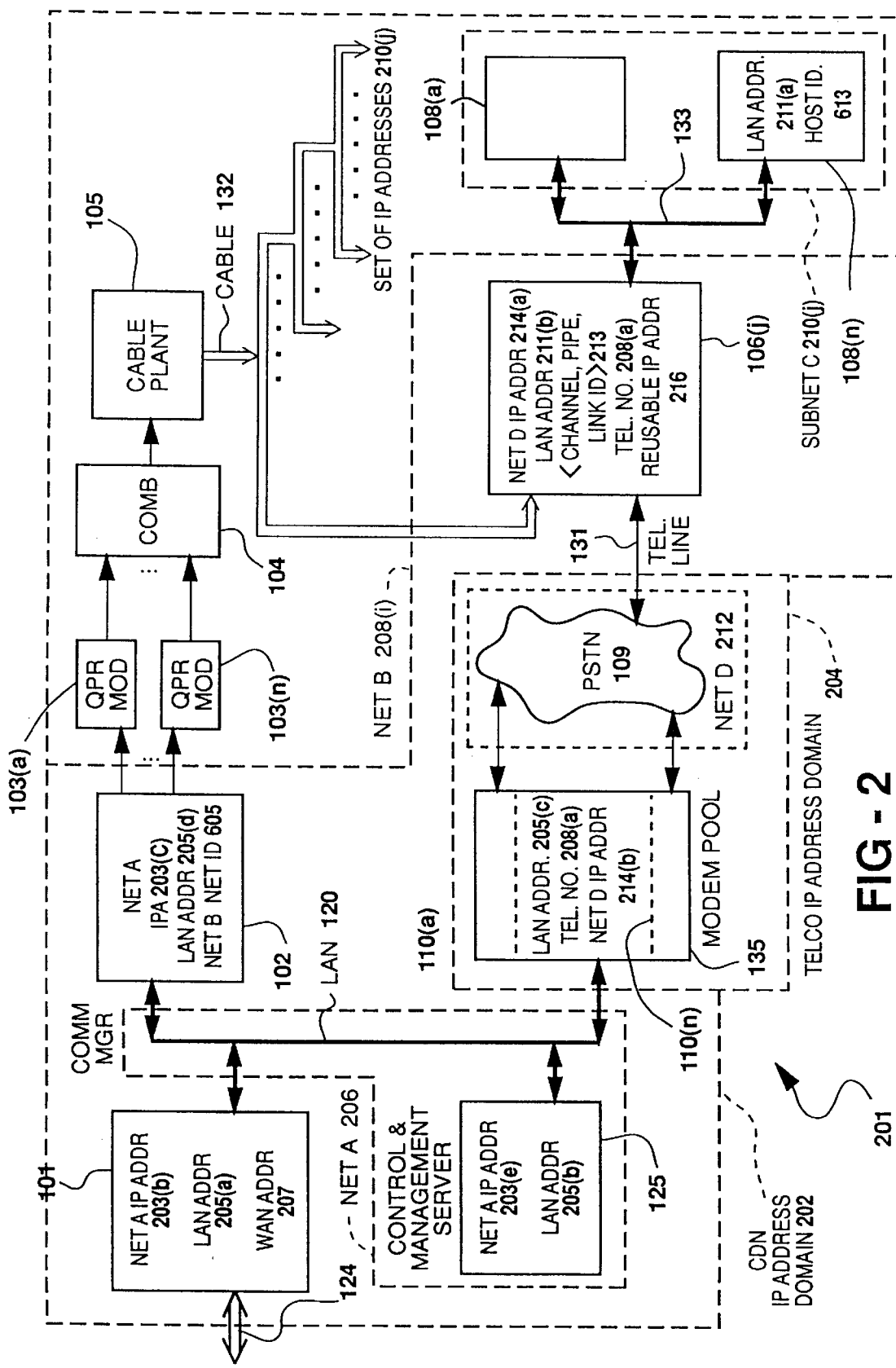
FIG. 2 shows the logical networks to which the IP addresses used in the cable data network belong.
Figure 6:
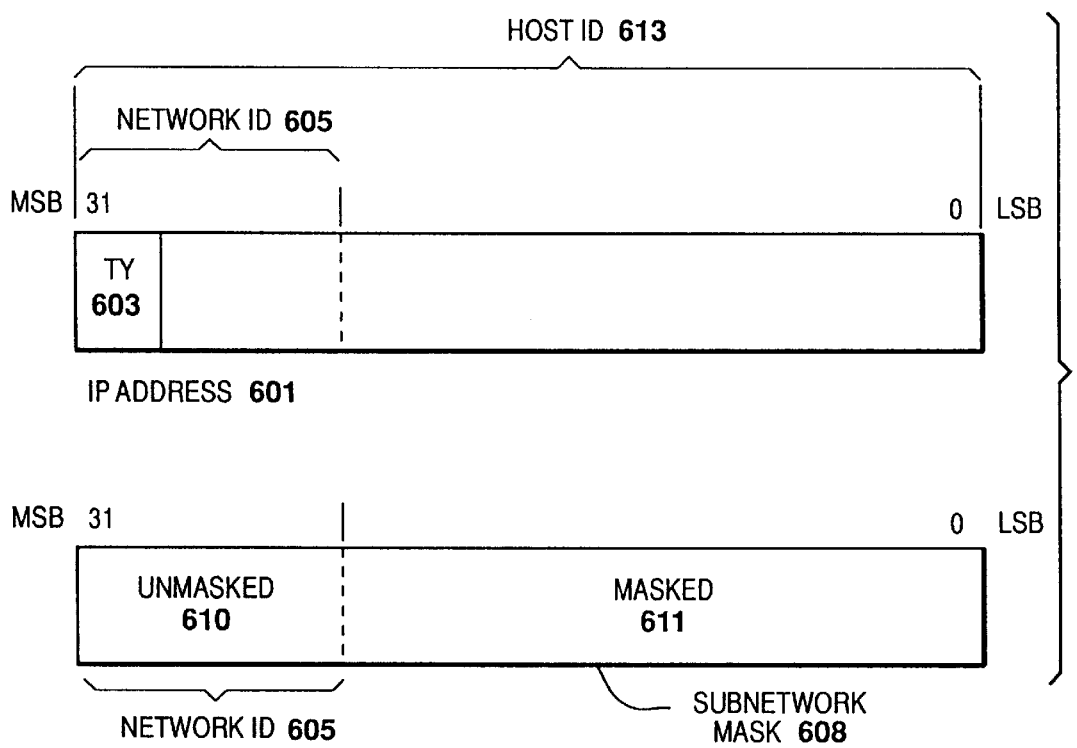
FIG. 6 is a diagram of the IP addresses and subnetwork masks employed in the cable data network.

IP Addressing Architecture of CDN 100: FIGS. 6 and 2

CDN 100 maintains its own IP address domain. The proprietors of CDN 100 receive a set of 32-bit IP addresses and can apply those addresses to devices connected to CDN 100 as they see fit. FIG. 6 shows 32-bit IP address 601. The 32 bits are divided into two fields: type field 603, which defines the type of IP address 601 and host ID field 613, which identifies a specific host 108. The host IDs are organized into sets of IDs for the networks in the address domain. This is done by means of a technique called classless interdomain routing (CIDR). In this technique, the entire address is a host ID 613 that identifies an individual host; some number of the most significant bits of the host IP address are designated to specify a given network belonging to the domain; these bits are the same for all IP addresses in the given network and make up network ID 605.

Packets with IP addresses that have been assigned using the CIDR technique are routed by means of subnetwork-mask. A subnetwork mask 608 is a 32-bit string of bits that is used to mask an IP address, that is, to select that part of the IP address that is currently relevant to the routing process. For example, if the IP address is being routed to the network it belongs to, the only part of the address that is relevant is the part that contains network ID 605. As shown in FIG. 6, in this case, unmasked part 610 selects the bits of network ID 605; masked part 611 hides the remaining bits of the IP address. Once the packet is in the network identified by network ID 605, the entire IP address is relevant and none of it is masked.

Using this technique, the proprietors of a domain of IP addresses can easily define the number of hosts in a network. In CDN 100, the bits of IP address 601 specified by the subnetwork mask that identifies network ID field 605 specify a portion of a metropolitan cable network (for example, a single cable 132, a single cable plant 105 and the cables radiating from it, or even a single head end 122 and the cables 132 served by it). Host ID field 613 identifies one of the hosts 108 in the network identified by network ID field 605. As one would expect from the fact that CDN 100 has a relatively small number of CATV cables, a relatively large number of RF modems 106, and a relatively small number of hosts 108 per RF modem 106, the number of bits in network ID field 605 is comparatively small.

Comparison of addresses for routing purposes is done using subnetwork masks 608. The order in which an IP address being routed is compared to addresses in the routing table is by the unmasked length of the address in the routing table. Thus, the address being routed is compared first with addresses that are completely unmasked. For details, see Stevens, supra, pp. 7–9 and 140–141.

FIG. 2 shows the IP networks that exist in the cable data network and how they relate to the link level networks. Each addressable component of the cable data network appears in FIG. 2 with the IP addresses and link level addresses that apply to it. As is the case with all IP networks, each host must have its own IP address and must have in addition the address of a gateway in the network to which it can send IP packets for routing. Only one set of the IP networks, namely networks B 208(0. . . n) need belong to cable data network IP address domain 202, that is, the cable data network assigns the addresses in these networks from the set provided to it. In the preferred embodiment, networks A and D also belong to address domain 202. IP addresses in network A all have network A's NetID 605, and IP addresses in network B 208(i) all have network B 208(i)'s NetID 605. The third IP network is network D 212. The router for this network is modem pool 135. In a preferred embodiment, the IP addresses in network D 212 are not visible outside cable data network 100. In other embodiments, the IP addresses in network D 212 may belong to another domain entirely, for example, one belonging to the telephone company that provides the modem pool.

Continuing with IP network A 206, this network has LAN 120 as its link level network. LAN 120 connects components of cable data network 100 that are always in use, and consequently, the IP addresses in network A 206 may be statically assigned. Routers with IP addresses in Net A are router 101, communications manager 102, and modem pool 135.

IP network B 208(i) may be one of several such networks, each of which will have its own statically-assigned NetID 605. Network B 208(i) has as its link layer one or more cables 132, to which RF modems 106 are connected. The router for network B 208(i) is communications manager 102. Each active RF modem 206(j) in network B 208(i) has a set 210(j) of IP addresses having network B 208(i)'s network ID 605 that are available to be assigned to hosts 108 connected to RF modem 206(j). An active RF modem 106 is one that has an active host 108 connected to it. Any IP address having the network ID for the network may belong to a given set 210(j). The link level network for each set of IP addresses 210(j) is the LAN 133 connecting the hosts 108 with RF modem 106(j). RF modem 106(j) serves as the router for that set of addresses. IP addresses of hosts 108 in net B 208(i) are dynamically assigned by control/management server 125. When RF modem 106(j) becomes active, control/management server 125 assigns modem 106 (j) a set of IP addresses for the hosts 108 connected to RF modem 106(j). The IP addresses have the NetID 605 for network B 208(i) and as many host Ds 613 as are required for the hosts 108. As will be explained in more detail below, every host 108 connected to an RF modem 106(j) has an IP address for RF modem 106(j). Cable data network 100 conserves IP addresses by giving RF modems 106(j) identical IP addresses on the LANs 133 connecting the RF modems 106 to their hosts 108.

As indicated before, network 212 D uses hidden IP addresses belonging to the domain of cable data network 100 in a preferred embodiment, but the IP addresses may also be provided by another party such as a telephone company. The link layer in this network is public switched telephone network 109. When RF modem 106(j) dials into modem pool 135, modem pool 135 dynamically assigns RF modem 106(j) an IP address. Modem pool 135 also functions as the router in network 212 D. Modem pool 135 routes incoming IP packets with RF modem 106(j)'s IP address via network D 212 to RF modem 106(j). When the RF link is inoperative, modem pool 135 also routes incoming packets with the IP addresses of the hosts 108 attached to RF modem 106(j) to RF modem 106(j), which routes them further to the hosts. Modem pool 135 additionally routes all outgoing packets received from RF modem 106(j) via LAN 120 to router 101.

Router 101 normally routes IP packets destined for network B to communications manager 102 and those destined for network D to modem pool 135. If there is a failure in network B, router 101 can also route packets destined for a host 108 connected to RF modem 106(j) to RF modem 106(j) via network D.

FIG. 2 also shows the IP and link layer addresses by means of which the components of CDN 100 may be reached. Beginning with the components on Net A 206, router 101 has an IP address 203(b) of its own in Net A 206 and also has an address 205(a) on LAN 120 and an address 207 on WAN 124. Communications manager 102 has an IP address 203(c) of its own in Net A 206 and an address 205(d) on LAN 120. Router 101 also routes all packets to communications manager 102 that are to be carried via the networks B 208 specified in one or more NETID fields 605 in the IP addresses. Continuing with control/management server 125, that component has an IP address 203(e) in Net A 206 and a LAN address 205(b). Modem pool 135 has an IP address 214(b) in Net D 212, a LAN address 205(c), and a telephone number 208(a) in PSTN 109.

Continuing with network B 208(i), a given host 108(k) has a dynamically-assigned IP address. In the address, the host ID 613 specifies host 108(k) and the net ID 605 specifies network B 208(i). Each host also has a LAN address 211(a) in LAN 133. The most complex addressing situation is that of RF modem 106(j). RF modem 106(j) has an IP address 214(a) in network D 212, and has a reusable IP address 216. At the link address level, RF modem 106(j) is addressed in cable 132 by a <channel,pipe,linkID> triple, has a telephone number 208(b), and a LAN address 211(b) in LAN 133.

Figure 9:
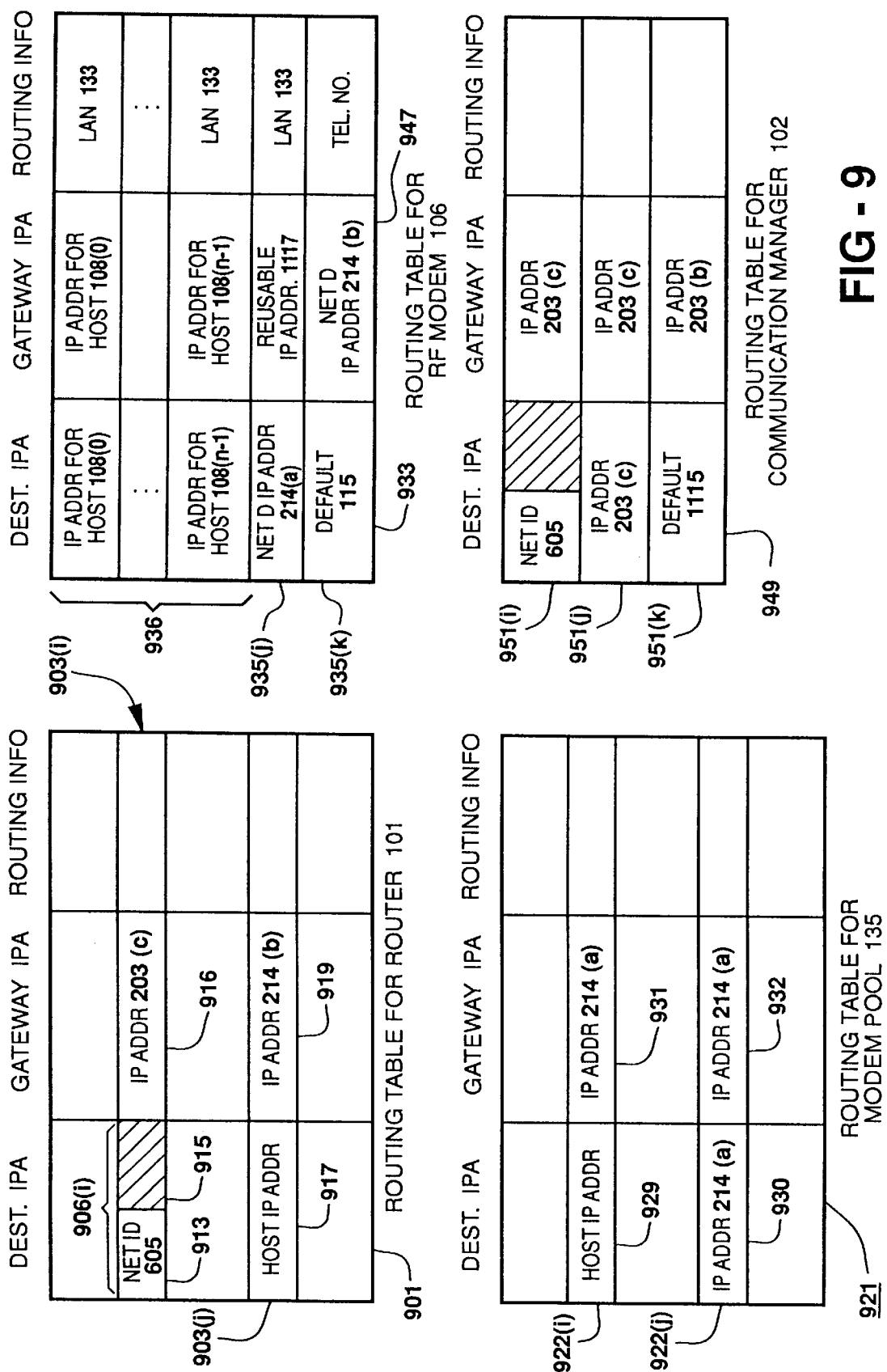
FIG. 9 is a diagram of routing tables for router 100, modem pool 135, RF modem 106, and communications manager 102.
Figure 10:
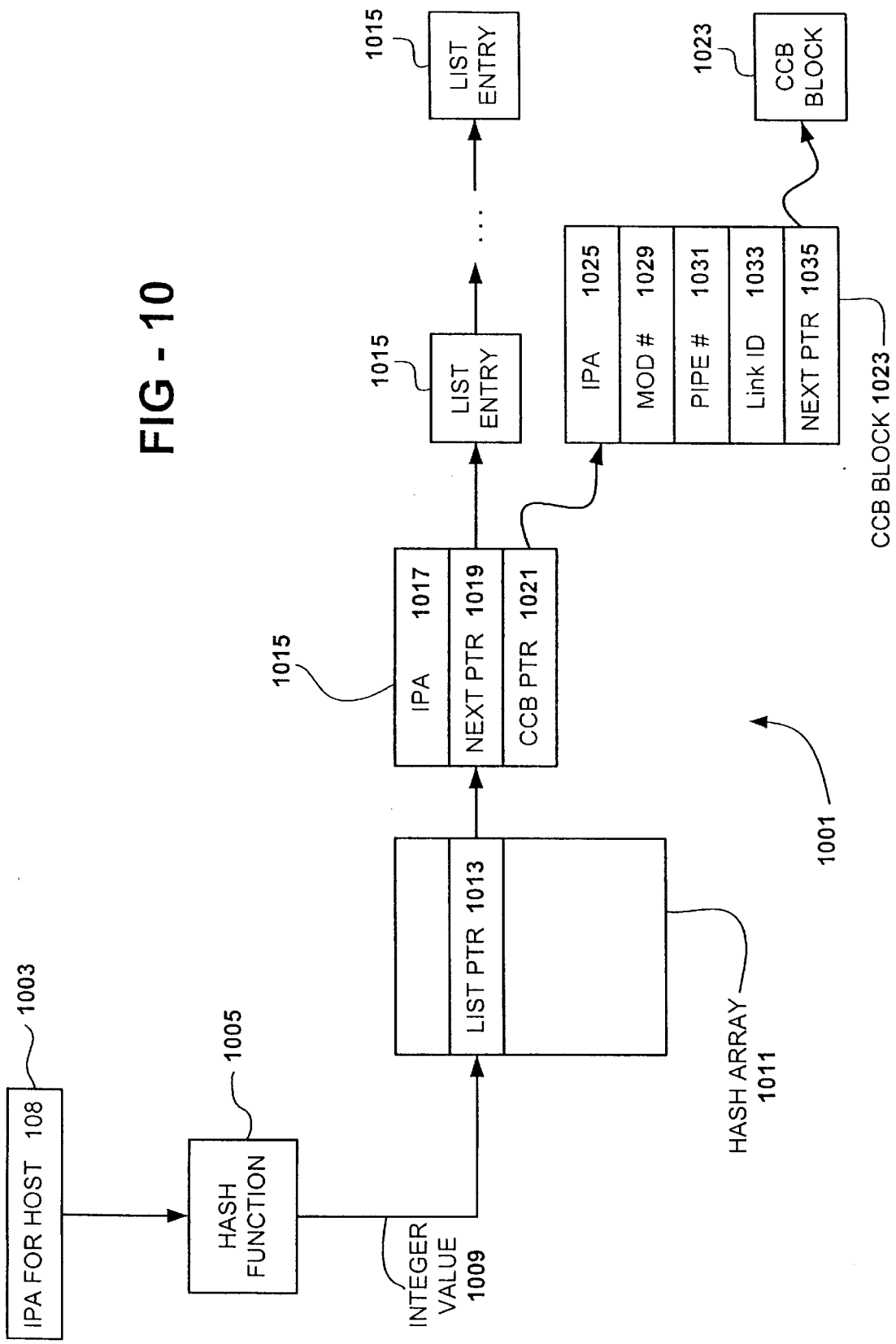
FIG. 10 is a diagram of the ARP cache for communications manager 102.

Routing and Routing Tables: FIGS. 9–11

Every host in an Internet network has a routing table. The routing table relates destination IP addresses of IP packets that are received in the host to gateway IP addresses of hosts on the same link-level network as the host to which the routing table belongs. If the host is a router, its routing table will relate IP addresses that are received in the router to IP addresses of hosts on the link-level networks that are connected by the router. Thus, a host can send an IP packet to a host on another link-level network by sending the packet to the router in the host's link-level network that sends packets to the other link-level network. Every host in an Internet network is also capable of executing the ARP protocol, which translates an IP address into a link-level address of the link-level network that the host is connected to.

Actually routing an IP packet received by a host is thus a two-step process. First, the host consults the routing table to find the gateway IP address corresponding to the IP packet's destination IP address; the gateway IP address specifies which host on the link-level network the IP packet is to be sent to; then the host executes the ARP protocol to find the link-level address of the host specified by the gateway IP address. When the host has the link-level address, it puts the IP packet in the form required by the link-level network and sends it to the link-level address. In order to save time in executing the ARP protocol, each host also has an ARP cache, which is a table of the current mappings between IP addresses of hosts in the link-level network and the link-level addresses of those hosts. For details on routing tables, see Stevens, supra, pp. 111–117; for details on the ARP protocol, see Stevens, supra, pp. 53–64.

FIG. 11 shows a routing table 1101 for a host 108(k) when host 108(k) is connected to cable data network 100. Host 108(k) has only three destinations to which it can route IP packets: to itself, to another host 108(i) connected to LAN 133, or to RF modem 106(j), which is of course a host in LAN 133, but is also the router for all IP packets that have destinations outside LAN 133. There are thus n+2 entries 1103 in routing table 1101, where n is the number of hosts 108 attached to LAN 133. Each entry has three parts: a destination IP address, a gateway IP address, which must be an IP address of a host on LAN 133, and routing information, which indicates among other things whether the host specified by the gateway IP address is a router and the name of the link-layer network upon which the packet is to be routed.

Entry 1103(i) is for the so-called loop-back interface. It has a special IP address that clients and servers on the same host can use to send IP packets to each other. Packets sent to this IP address are processed completely within client 108 and never appear on LAN 133. As can be seen from FIG. 11, the same loopback IP address 1103 is used for both the destination IPA and the gateway IPA. The entries labelled 1104 are for the other hosts 108 in set 210(j). Each of these has the full IP address of the given host as both its destination IP address and its gateway IP address. What this means is that when a packet has an IP address that matches the destination IPA in entry 1103(j), its ultimate destination is a host 108(l) and the next step in the routing is for host 108(k) to use the ARP protocol to determine the LAN address corresponding to the packet's gateway IP address and then to send the IP packet to the LAN address.

IP packets whose destination addresses are not in set 210(j) are handled by entry 1103(k), which is the default entry for IP addresses that cannot be routed using other entries 1103. The default IPA 1115 is accordingly the destination IPA. The gateway IPA is the reusable IPA for RF modem 106(j). As will be explained in more detail later, this reusable IPA 1117 does not belong to the set of IP addresses 210(j) that are dynamically assigned to hosts 108 connected to LAN 133 when RF modem 106(j) becomes active. When host 108(k) receives a packet that matches default entry 1103(k), host 108(k) uses the ARP protocol to find the LAN address corresponding to re-usable IPA 1117, that is, the LAN address of RF modem 106(j) and sends the IP packet to RF modem 106(j). Since both the hosts 108 and RF modem 106(j) are connected to LAN 133, the routing info in entries 1104 and 1103(k) specifies LAN 133.

FIG. 10 also shows ARP cache 1119 for host 108(k). Cache 1119 has a cache entry 1120 for each host 108 connected to LAN 133 that currently has an IP address assigned to it, shown at 1122; and a cache entry 1120(j) for RF modem 106(j). In entries 1122, each entry has the IP address 1121 for the host 108 to which the entry belongs and the LAN address 1123 for the host 108; entry 1120(j) has reusable IP address 1117 for RF modem 106(j) and RF modem 106(j)'s LAN address 1125.

FIG. 9 shows the routing tables for router 101, modem pool 135, and RF modem 106.

Beginning with routing table 901 for router 101, for purposes of the present discussion, two routings are of interest in routing table 101. The routing shown by entry 903(i) is for an IP address that specifies a host 108 when the RF link connecting head end 122 to host 108's RF modem 106 is functioning. In entry 903(i), the destination IP address is masked so that only NetId 605 is used for routing. Since that is the case, entry 903(i) matches every destination IP address 307 with that Net ID 605, that is, the net addresses for all of the hosts which are connected to the RF network to which cable 132 belongs. The gateway IP address is IP address 203(c) for communications manager 102. Thus, unless there is an entry 903 whose mask is longer than the one used with entry 903(i), the packet is routed to communications manager 102.

As will be explained in more detail below, as long as the RF link provided by cable 132 to RF modem 106 is functioning, there will only be an entry for the Net ID 605 for the network that RF modem 106 is attached to, and thus all packets directed to hosts 108 attached to RF modem 106 will be routed via communications manager 102 and cable 132. If all or part of the RF link fails, an entry like that for 903(j) is made in routing table 901 for each host 108 attached to an RF modem 106 whose RF link has failed. In this entry, the unmasked IP address of the host is used as the destination IP address and the gateway IP address is IP address 214(b), which is the address of modem pool 135. As long as entry 903(j) exists in routing table 901, packets addressed to the host 108 specified in the destination IP address will go by way of modem pool 135 and public switched telephone network 109, rather than by way of cable 132.

Continuing with routing table 921 for modem pool 135, this routing table has the same basic structure as routing table 901 Again, there are two entries that are of interest in the present situation. When a given RF modem 106(i) is receiving IP packets addressed to its hosts 108 by way of cable 132, it is still capable of receiving IP packets addressed to RF modem 106(i)'s IP address 214(a), and consequently, there will be an entry 9220) for that IP address as long as RF modem 106(i) is active. In that entry, the destination IP field 930 and the gateway IP field 932 will both have IP address 214(a).

When RF modem 106(i)'s RF link via cable 132 has failed, there will be another entry 922(i) for each of the hosts 108 attached to RF modem 106(i). This entry's destination IP field 929 will contain the IP address 929 for the host 108, and the gateway IP address field 931 has IP address 214(a) for RF modem 106(i). Thus when the RF link is down, packets for hosts 108 routed to modem pool 135 by router 101 are further routed by modem pool 135 to RF modem 106(i).

Continuing with routing table 933 for RF modem 106, this routing table has an entry 935 for each host 108 attached to LAN 133 and two others that are of interest in the present context. In the entries 936 for the hosts 108, each contains the host's IP address as both its destination IP address and gateway IP address. Entry 935(j)'s destination IP address is the IP address 214(a) assigned RF modem 106(j) by modem pool 135 when RF modem 106(j) became active; the gateway IP address here is again RF modem 106(*i*)'s reusable IP address 1117. This entry routes messages for RF modem 106(*j*) received via PSTN 109 to RF modem 106(*j*) itself. The final entry, 935(*k*), is the default entry; the gateway IP address is IP address 214(*b*) for modem pool 135, and thus, all remaining packets received by RF modem 106(*j*) are routed via PSTN 109 to modem pool 135 and from thence to router 101.

The routing table for communications manager 102 is shown at 949. Again, there are three entries 951 of interest. Entry 951(*i*) routes all IP packets destined for the networks managed by communications manager 102; in the destination IPA portion of this entry, everything is masked but the net ID portion of the address. Entry 951(*j*) routes packets intended for communications manager 102 itself; the destination IPA and the gateway IPA are IPA 203(*c*) for communications manager 102. Default entry 951 (*k*), finally, has as its gateway IPA the IP address 203(*b*) of router 101; consequently, all other IP packets are routed back to router 101 via LAN 120.

FIG. 10, finally, shows the implementation of ARP cache 1001 in communications manager 102. The technique used to implement the table is hashing, which is a standard technique for reducing search time in large tables. In ARP cache table 1001, the IP addresses 1003 for incoming packets addressed to a host 108 are hashed, that is, they are input to a function 1005 which produces small integer values 1009 from the IP addresses. The small integer is used as an index into a hash array 1011, whose elements are pointers 1013 to lists of IP addresses that hash to the index of element 1013. Each list entry 1015 has three fields: field 1017 contains a destination IP address; field 1019 is a pointer to the next list entry 1015 in the list, and CCB pointer 1021 is a pointer to a data structure called a CCB block 1023 which specifies the frequency, pipe number, and linkID to which packets having IP address 1017 may be sent. The fields of CCB block 1023 are IP address 1025, which has the same IP address as IPA 1017, modulator number 1029, which effectively specifies the frequency, pipe number 1031, which specifies the pipe, linkID 1033, which specifies the RF modem 106, and next pointer 1035, which specifies the next CCB block 1023. Translation of an IP address into the corresponding <channelpipe number,linkID> triple works by hashing the IP address to get the index of list pointer 1013, following list pointer 1013 to the list, searching list entries 1015 until one is found that has the IP address being translated as its IP address 1017, and going to that list entry 1015's CCB block 1023 to find the information needed to form the triple. It is worth noting here that it is the structure of ARP cache 1001 which makes it possible in a preferred embodiment to use any IP address in the network of the cable 124 to which an RF modem 106(*j*) is attached for a host 108 that is attached to RF modem 106(*j*).

Figure 12:
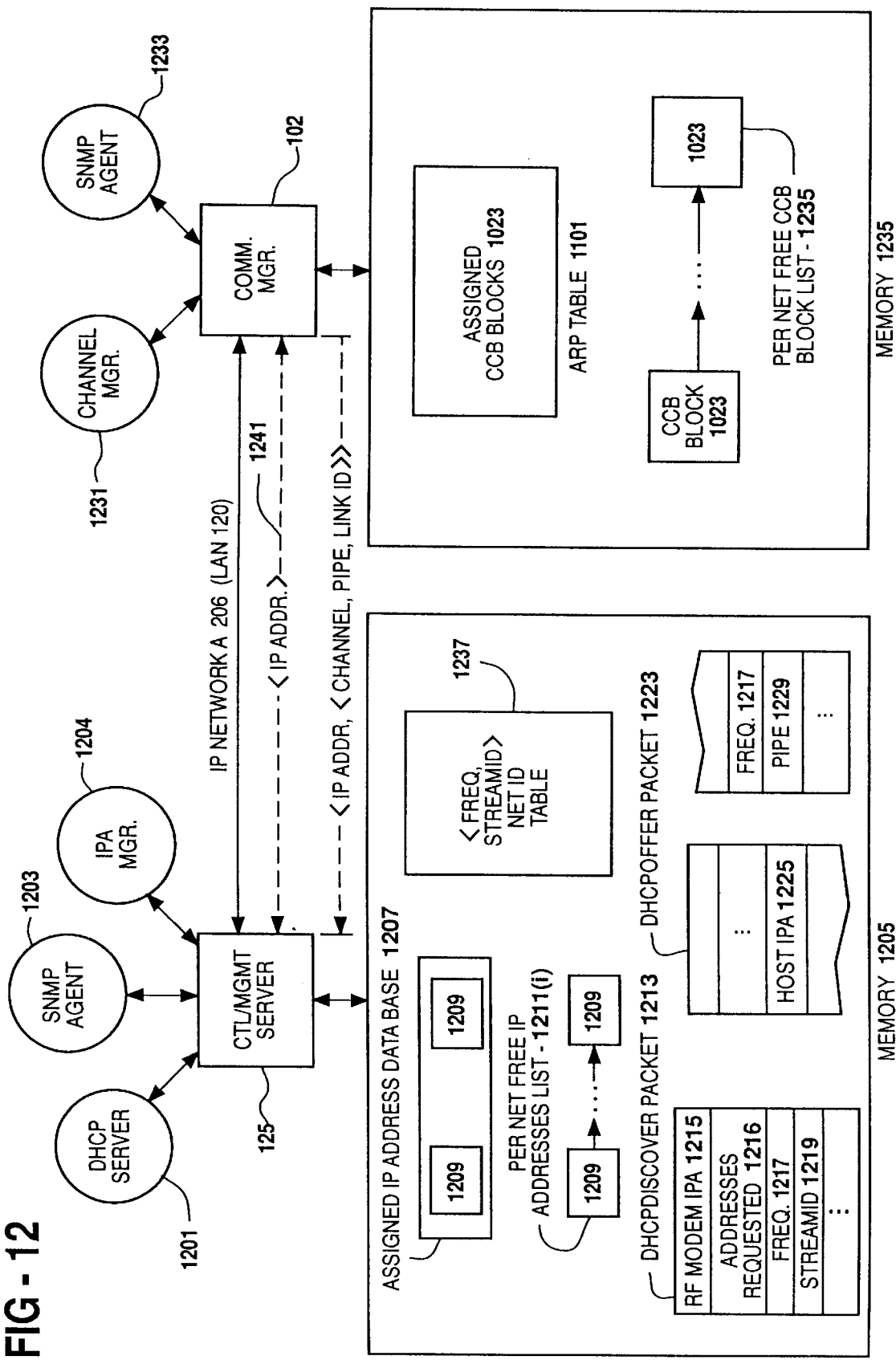
FIG. 12 is a diagram showing how IP addresses and <channel,pipe,LinkID> triples are dynamically assigned.

Dynamic Assignment of Resources: FIG. 12

A problem in the design of networks that employ IP addresses is that the IP addresses are only 32 bits long. The maximum number of addresses is consequently $2^{32}$, and the enormous growth of the Internet has resulted in a shortage of IP addresses. One of the techniques that cable data network 100 employs to reduce the number of IP address needed in cable data network 100 is the dynamic assignment of IP addresses to hosts 108 in network B 208(*i*) and of the <channel,pipe,link ID> triples used to specify destinations of data in cable 132 to RF modems 106(*j*). Dynamic assignment means here that the IP addresses in a given set of addresses C 210(*j*) and the <channel,pipe,link ID> triple listened to by RF modem 106(*j*) are assigned to RF modem 106(*j*) for the period of time that RF modem 106(*j*) is active. When RF modem 106(*j*) is not active, the IP addresses are available for assignment to other hosts 108 and the <channel,pipe,link ID> triple is available for assignment to another RF modem 106(*k*). Since only a small percentage of hosts 108 is active at a given time, dynamic assignment makes it possible to share a relatively small number of IP addresses and <channel,pipe,link ID> triples among a much larger number of users. It should be further noted here that the binding between a <channel,pipe,link ID> triple and the set of IP addresses 210(*j*) is also dynamic, i.e., what IP addresses correspond to a given <channel,pipe,link ID> triple is decided only when the IP addresses and the <channel,pipe,link ID> triple are assigned.

FIG. 12 shows the system used to do dynamic assignment of IP addresses and <channel,pipe,link ID> triples in a preferred embodiment. Dynamic assignment is handled cooperatively by control/management server 125 and communications manager 102. Both are hosts in IP network A 206 and have TCP/IP SNMP (simple network management protocol) agents 1203 and 1233, and control/management server 125 and communications manager 102 can cooperate by means of SNMP messages. For details on SNMP, see Stevens, supra, pp. 359–387.

Control/management server 125 further has a DHCP server 1201 and an EPA manager 1204 executing on it. DHCP server 1201 responds to IP packets belonging to the TCP/IP DHCP (Dynamic Host Configuration) protocol. As will be explained in more detail below, this protocol is employed to dynamically assign an IP host an IP address. Details on the DHCP protocol may be found in R. Droms, *Dynamic Host Configuration Protocol*, RFC 1541, obtainable in March 1997 at the URL www.cis.ohiostate.edu/htbin/rfc/rfc1541.html. The IP addresses themselves are managed by IPA manager 1204. Communications manager 102 also has executing on it a channel manager 1231, which manages the <channel,pipe,link ID> triples assigned to RF modems 106.

Assignment of IP addresses to hosts 108 connected to RF modem 106 and of a <channel,pipe,link ID> triple to RF modem 106 begins when DHCP server 1201 receives a DHCPDISCOVER message from an RF modem 106(*j*) that has become active. The DHCPDISCOVER message requests assignment of a number of IP addresses for the hosts 108 attached to RF modem 106(*j*). In the preferred embodiment, the DHCPDISCOVER message includes the IP address 1215 of RF modem 106(*j*) (assigned it by modem pool 135). The vendor-encapsulated-options part of the DHCPDISCOVER message includes the following, as shown at 1213 in FIG. 12:

The number of addresses being requested 1216. An address is requested for every host 108 connected to RF modem 106(*j*).

<frequency,streamID> pair 1217 and 1219. These uniquely identify the cable 132 that RF modem 106 is connected to.

The IP addresses of the hosts 108 are assigned by IP address manager 1204, with the assistance of SNMP agent 1203. The first step in assigning the IP addresses is determining which IP network B 208(*i*) the cable 132 belongs to that RF modem 106(*j*) is connected to. IPA manager 1204 uses <freq,streamID,NETID> table 1237 to make this determination. Each entry in the table relates a <frequency, streamID> pair to a Net ID. All IP addresses assigned in the IP network B 208 identified by the Net ID must include the Net ID. The information in table 1237 is provided by channel manager 1231 in communications manager 102.

When IPA manager 1204 has the Net ID, it can assign the IP addresses. IPA manager 1204 has a list 1211(*i*) of free IP addresses for each network B 208(*i*), and it takes a set of IP addresses that has the number of addresses specified in address range 1216 from the free list 1211 for the network B 208(*i*). IPA manager 1204 then provides an SNMP set message with the IP addresses to SNMP agent 1203. As shown by arrow 1241, SNMP agent 1203 sends the message to SNMP agent 1233 in communications manager 102.

SNMP agent 1233 passes the message on to channel manager 1231, which maintains a list 1235 of free CCB blocks 1023 for each network. Channel manager 1231 finds a free CCB block in the list for the specified Net ID. The block is for a particular <channel,pipe> pair. Channel manager 1231 fills the IP address from the SNMP message and a link ID for the RF modem 106 into the CCB block 1023 and adds CCB block 1023 to ARP table 1101. Channel manager 1231 then uses SNMP agent 1233 to send a return message via SNMP agent 1203 to IPA manager 1203. As shown at arrow 1243, the return message contains the IP address and the <channel,pipe,link ID> triple that has been assigned to it. Channel manager 1231 adds entries for the newly-assigned IP addresses to its assigned EPA data base 1207. Each entry contains the IP address and the <channel, pipe,link ID> triple. Now that all of the information needed to relate the IP addresses of RF modem 106(*j*)'s hosts 108 to a <channel,pipe,link ID> triple on cable 132 is available, DHCP server 1201 returns a DHCPOFFER IP packet to RF modem 106(*j*) which is to receive the IP packets whose destination IP address belong to the set of addresses 210(*j*) corresponding to the <channel,pipe,linkID> triple.

In a preferred environment, IP addresses assigned to the hosts belonging to RF modem 106 are deassigned when RF modem 106(*j*) becomes inactive. This is detected by modem pool 135 when RF modem 106(*j*) hangs up and modem pool 135 sends an SNMP message to SNMP agent 1203 in control/management server 125 informing agent 203 of that fact. Agent 1203 removes the entries for the IP addresses for the hosts 108 connected to RF modem 106(*j*) from its data base and returns the IP addresses to IPA manager 1204, which puts them on the proper free list 1211(*i*). Agent 1203 also sends an SNMP message to SNMP agent 1233 in communications manager 102 informing communications manager 102 that the IP addresses have been deassigned. Agent 1233 passes the IP addresses to channel manager 1231, which removes the CCB blocks for the IP addresses from ARP table 1101 and returns them to the free CCB block list 1235 for the network to which the addresses belong.

In other embodiments, additional techniques may be employed to ensure that IP addresses and <channel,pipe,link ID> triples that are not being used are deassigned. One technique is the lease mechanism in the DHCP protocol. This mechanism assigns an IP address only for a limited period of time; if another DHCP protocol renewing the lease is not received from RF modem 106(*j*) within the limited period of time, the IP address is deassigned. Another is to monitor the number of packets sent to an IP address over a period of time. If there are none, the address is deassigned. The same technique may be used with <channel,pipe,link ID>triples; if there is no traffic on the <channel,pipe,link ID> triple, it is deassigned. In general, techniques analogous to those used to recover cache entries or memory pages may be used with IP addresses and <channel,pipe,link ID> triples.

Setting up a Session with RF Modem 106

Figure 7:
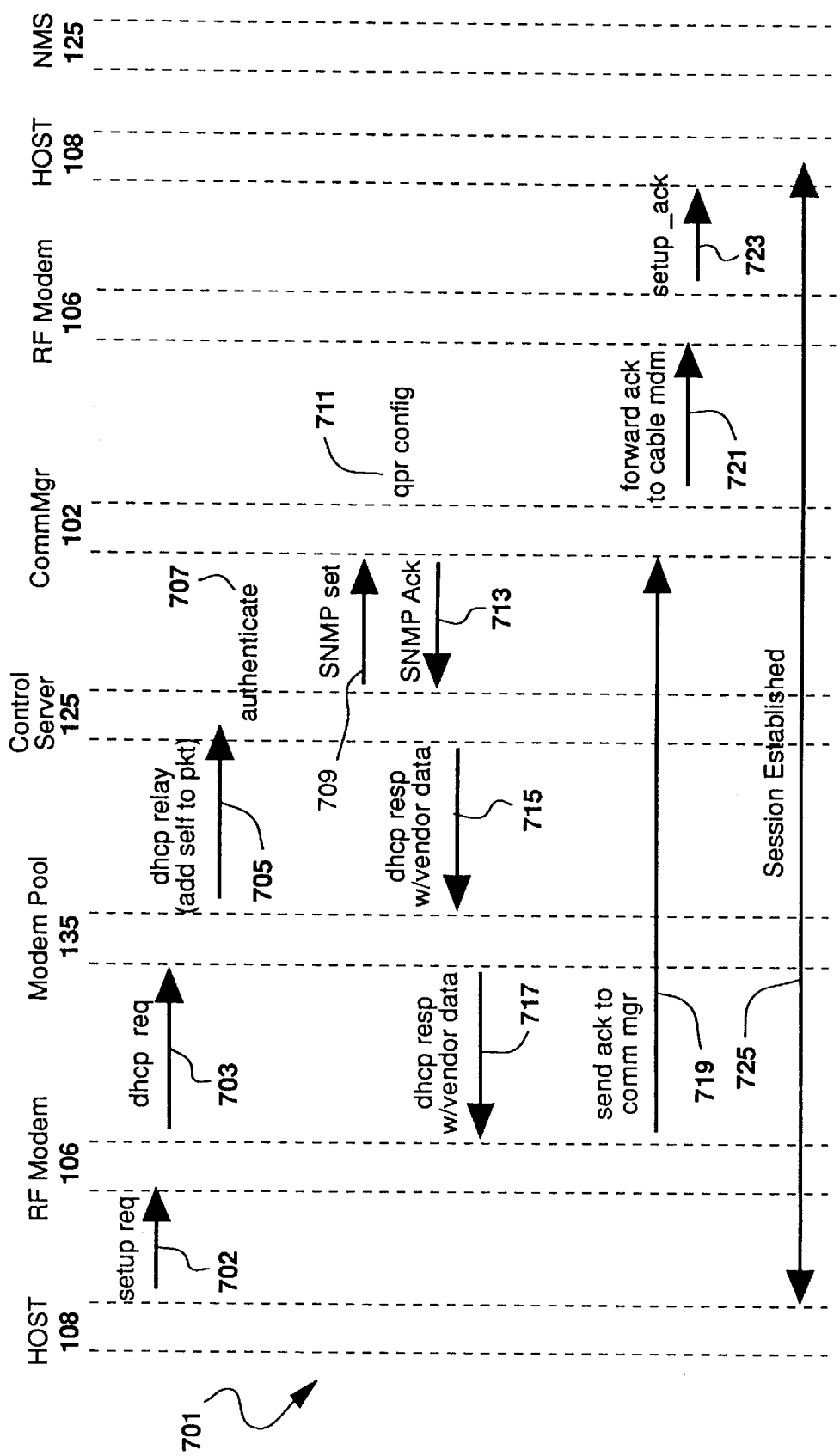
FIG. 7 is a diagram that shows how the RF modem receives IP addresses and a <channel,pipe,link ID> triple when the RF modem becomes active.

FIG. 7 shows the interactions 701 between the components of cable data network 100 when a RF modem 106(*i*) is inactive and a user of host 108(*j*) connected to RF modem 106(*i*) wishes to become connected to Internet 150. The user executes routines in software 107 which cause host 108(*j*) to send a setup request to RF modem 106(*i*) at modem 106(*i*)'s address in LAN 133, as shown at 702. Included in the setup request is authentication information such as a user identification and password and the telephone number of telephone modem pool 135. In the preferred embodiment, the authentication is for all of the hosts 108 connected to RF modem 106. RF modem 106 responds by first sending a dummy IP address to host 108(*j*) and then dialing the telephone number. The dummy IP address has a short lease, i.e., is valid for only a short time. Telephone modem pool 135 responds by setting up a Point-to-Point Protocol (PPP) link via PSTN 109 between RF modem 106 and a Tmodem 110(*k*). Once this is done, RF modem 106 sends the authentication information to modem pool 135, which passes them on to control/management server 125. Control management server 125 then checks the authentication information, and if it is valid, control/management server 125 assigns an IP address in network D 21Z to RF modem 106(*i*). It returns the IP address to RF modem 106(*i*). RF modem 106(*i*) can now use TCP/IP protocols to communicate with the head end devices connected to LAN 120.

RF modem 106(*i*) must next obtain an IP address for host 108(*j*) and the <channel,pipe,link ID> triple which it is to receive packets addressed to host 108(*j*)'s IP address on cable 132. To do this, it sends a DHCPOFFER IP packet 703 to modem pool 135. Included in the vendor-encapsulated options portion of the protocol are the IP address of RF modem 106(*i*) and a <frequency, streamID 405> pair which RF modem 106(*i*) obtains by listening to any frequency on cable 132. As explained earlier in the discussion of superframes 405, the <frequency,streamID> pair uniquely identifies which cable 132 RF modem 106(*i*) is connected to.

Modem pool 135 receives DHCPOFFER packet 703, adds modem pool 135's IP address to it, and unicasts the packet via net A 206 to DHCP server 1201. DHCP in control/management server 125 responds to packet 703 and assigns IP addresses for the hosts 108 attached to RF modem 106(*j*) and a <channel,pipe,link ID> triple to RF modem 106 as described above. The IP addresses have leases that are long enough for the period for which an RF modem 106 is typically active. Next, control/management server 125 sends a DHCPOFFER packet 715 addressed to RF modem 106's IP address. This is routed to to modem pool 135. The OFFER packet contains the following information:

Range of IP addresses for the hosts 108 connected to RF modem 106.

An IP address for RF modem 106 in Ethernet 133. As will be explained in more detail below, this IP address is not unique to RF modem 106.

the subnet mask for the host IP addresses.

IP addresses in network A 206 for a domain name server, for SNMP agent 1203, for communications manager 102, and for router 101.

Information about where RF modem 106 can obtain current firmware.

The <channel,pipe, link ID> triple that has been assigned to RF modem 106.

Telephone modem pool 135 forwards the DHCP response packet to RF modem 106(*i*) (717) and RF modem 106(*i*) sets its tuner 501 to listen on the specified frequency and its decoder 503 to read superpackets on the specified pipe when they have the RF modem's link ID.

By this time, the lease on host 108(*j*)'s dummy IP address is about to expire and host 108(*j*) sends a DHCPDISCOVER packet requesting a new IP address. RF modem 106(i) responds by assigning one of the IP addresses it received in its DHCPOFFER packet to host 108(j) and sending a DHCPOFFER packet with the IP address to host 108(j). Similarly, when RF modem 106(i) receives a DHCPDISCOVER packet from any of the other hosts 108 attached to LAN 133, it assigns one of the IP addresses to that host 108 and sends the host 108 a DHCPOFFER packet that contains the assigned IP address.

In other embodiments, RF modem 106(i) may further respond to the DHCP OFFER packet 715 by sending an acknowledgment IP packet via PSTN 109 and modem pool 135 to communications manager 102 (719). Communications manager 102 responds to the acknowledgment by sending an acknowledgment 721 on the cable 132 at the channel and pipe RF modem 106(i) is listening to. The acknowledgment contains at least RF modem 106(i)'s linkID.

Taking Down a Session with RF Modem 106

As long as any of hosts 108 is connected to Internet 150, RF modem 106 listens for super packets addressed to it at the <channel,pipe,link ID> triple for RF modem 106 and maintains its connection via the telephone network to modem pool 135. When the last host 108 shuts down its connection to Internet 150, RF modem 106 hangs up on the telephone line connecting it to modem pool 135. Modem pool 135 responds to the fact that RF modem 106 has hung up with a DHCP release message to DHCP server 1201. The DHCP release message specifies the IP addresses assigned to RF modem 106.

Server 125 sends an SNMP packet to communications manager 102 instructing it to remove the entries for the IP addresses from its ARP cache 1001. Communications manager 102 returns the channel,pipe,linkID> triple to its list of free <channel,pipe,linkID> triples. When server 125 receives an SNMP acknowledgment from communications manager 102, it deletes the entries for the IP addresses for the hosts 108 connected to the IP modem from its data base and returns the IP addresses to its list of free IP addresses. In other embodiments, the DHCP protocols used to get and free IP addresses for hosts 108 may originate with the individual host 108.

RF Modem 106 as a Proxy DHCP Server

The entities in a network that respond to DHCP protocols are known as DHCP servers. In cable data network 100, the DHCP server is implemented in software running on control/management server 125. Additionally, however, each active RF modem 106(i) functions as a proxy DHCP server. By this is meant that it retains enough information locally to handle DHCP protocols that originate with hosts 108 connected to RF modem 106(i). In so doing, it appears to host 108 as a standard DHCP server and further greatly decreases the amount of traffic required to provide hosts 108 with IP addresses.

Standard DHCP servers are always active; thus, the standard Internet client software running on host 108 expects that the DHCP server will always respond to a DHCPDISCOVER packet from a host with a DHCPOFFER packet that contains an IP address for host 108. RF modem 106, however, is not always active and may have to establish a connection with Network A 206 and use the DHCP protocol to obtain the IP addresses for subnetwork C 210(j) before it can respond to a DHCPDISCOVER packet from a host 108. For that reason, when RF modem 106 first becomes active, it provides the host 108 that caused it to become active with a short-lived dummy IP address as previously described. RF modem 106 then obtains a set of IP addresses for its hosts 108 as previously described. Once it has the IP addresses, it responds to DHCPDISCOVER packets from the hosts 108 by assigning the hosts 108 IP addresses from the set. There is thus no need in these cases to send a DHCPDISCOVER packet to modem pool 135 and control/management server 125.

Figure 8:
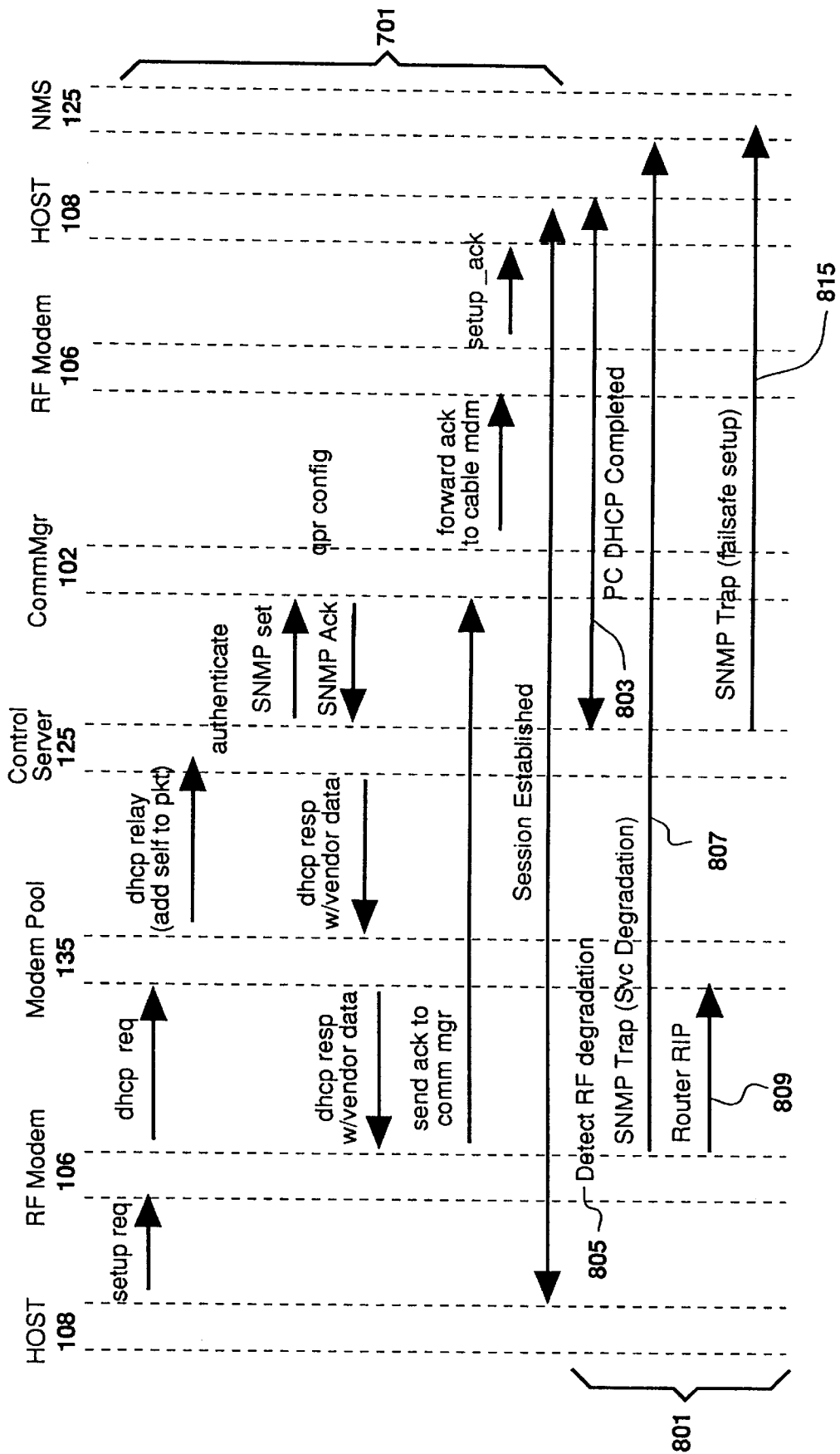
FIG. 8 is a diagram that shows how IP packets addressed to hosts are rerouted via the telephone network when the RF modem detects a failure in the RF link.

Automatic Rerouting in the Event of a Failure of the RF Link: FIG. 8

An important advantage of cable data network 100 is that if the RF link to a RF modem 106(i) fails, cable data network 100 automatically reroutes packets addressed to hosts 108 connected to that RF modem so that they are routed by way of modem pool 135 and public switched telephone network 109 to RF modem 106. When the RF link is again operative, cable data network 100 automatically again reroutes the packets via the RF link. This automatic fallback and restoration feature takes full advantage of the fact that public switched telephone network 109 is bidirectional and of the fact that an active RF modem 106 has an IP address by means of which it is accessible via modem pool 135 and PSTN 109.

The automatic fallback and restoration feature is implemented using the TCP/IP routing information (RIP-2) protocol, described beginning at page 29 of Stevens, supra. This protocol is used in networks employing IP addresses to propagate addressing information among the routers in the network. Any other protocol which performs this function could also be employed. Typically, each router in a network will broadcast a RIP packet to the other routers every thirty seconds or so. The RIP packet contains the current routing table of the router sending the RIP packet. The other routers read the RIP packet and update their routing tables accordingly. A triggered RIP packet is sent each time the metric for a route changes. The metric is a value which expresses the cost of sending a packet by the route. Each router keeps track of the time interval since it last received an RIP packet from each of the other routers, and if the time interval exceeds a predetermined maximum, the router removes the routes it received from that router from its routing table.

In the preferred embodiment, when RF modem 106 is active, it is constantly listening to cable 132. If tuner 501 detects that there is no RF signal on the channel it is listening to or decoder 503 detects that it is no longer receiving superframes 405, or that it can no longer decode the superpackets 407 it is receiving, or that the number of superpackets 407 with errors has increased above a predetermined threshold, tuner 501 or decoder 503 signals an error condition to CPU 505. What happens next is shown in FIG. 8. Portion 701 of the figure is the setup scenario of FIG. 7; portion 801 shows how RF modem 106 and system 100 respond when such an error condition occurs.

As shown at 803, when the error condition occurs, the routing tables in router 101 and communications manager 102 are routing IP packets addressed to hosts 108 via communications manager 102 and cable 132; IP packets from hosts 108 to IP addresses in Internet 150 are being routed via RF modem 106, PSTN 109, telephone modem pool 133, LAN 120, and router 101. This condition is indicated in portion 801 at 803. At 805, RF modem 106 detects a failure in the RF link; RF modem 106 thereupon sends an SNMP trap packet, i.e., an error message that uses the TCP/IP SNMP (Simple Network Management Protocol) addressed to control/management server 125 via PSTN 109 and telephone modem pool 135. The network management system (NMS) is implemented by programs executing on server 125, and NMS responds to the trap packet by recording the fact that there has been a failure in the RF link in its system management data bases. The NMS system response may also include other actions such as generating a display showing the problem in the NMS graphical user interface (GUI) or triggering an alarm.

Next, RF modem 106 sends a triggered RIP packet to modem pool 135 with RF modem 106's routing table. Modem pool 135 responds to the RIP packet by adding the IP addresses of the hosts 108 to its own routing table 921. It then sends a triggered RIP packet with the changes to the routers on LAN 120. Router 101 responds to the RIP packet by adding the IP addresses for the hosts 108 to its routing table 901. In other embodiments, RF modem 106 may send triggered RIP packets directly to modem pool 135 and router 101. As explained in the discussion of routing tables above, the result of these changes is that packets addressed to hosts 108 are now routed to hosts 108 via modem pool 135 and PSTN 109. Control/management server 125 also receives the RIP packet and generates an NMS trap 815 for the NMS system which indicates to it that the fallback setup has been completed. The NMS system stores that information in its data base and changes the displays showing the network accordingly.

It is important to note here that as long as the RF link is operative and RF modem 106 is active, the routing of packets to hosts 108 connected to RF modem 106 does not change. Consequently, when the RF link is operative, RF modem 106 does not produce RIP packets. However, as long as the RF link is inoperative, RF modem 106 periodically produces RIP packets in the fashion of other routers and the RIP packets are sent to modem pool 135 and router 101 as just described. The fallback routing for the IP addresses belonging to the hosts 108 continues as long as RF modem 106 continues to send RIP packets. If RF modem 106 senses that the RF link is again operative, RF modem 106 sends another triggered RIP packet with its routing table, but with the metric for reaching the hosts 108 set so high that modem pool 135 and router 101 remove the entries for the hosts' IP addresses. Thereupon, RF modem 106 ceases sending RIP packets. If RF modem 106 simply ceases sending RIP packets, for example because a user has turned it off, the entries for the hosts' IP addresses are removed from the routers in the manner described in the discussion of the RIP protocol above.

Reusable IP Addresses for RF Modems 106: FIG. 11

As mentioned above, a major goal in the design of cable data network 100 is reducing the number of IP addresses required for the cable data network. One technique used to achieve this goal is to give all RF modems 106 in a network the same reusable IP address in the LANs 133 to which the hosts 108 are attached for which RF modem 106 is the router. This is possible because RF modem 106's IP address in LAN 133 is used only by hosts 108 attached to LAN 133; IP packets sent to RF modem 106 from other hosts are sent to IP address 214(a) in network D 212, which is provided by modem pool 135. Since RF modem 106's IP address in LAN 133 is not visible outside LAN 133, the IP address can be the same in all LAN 133s. As indicated in the discussion of setting up a session above, RF modem 106 receives its IP address in LAN 133 in the DHCPOFFER packet that contains the IP addresses for its hosts 108 and RF modem 106's <channel,pipe,link ID> triple. The savings of IP addresses made possible by this technique are significant. For example, many LANs 133 will be in private households and will have only a single PC as a host 108. Both the PC and RF modem 106 must have an IP address on LAN 133. It should further be noted that because reusable IP address 117 is used only within the LANs 133 connected to RF modem 106, there is no need that it even be an IP address in the address domain of cable data network 100.

Conclusion

The foregoing Detailed Description has disclosed to those skilled in the relevant arts how to make and use a cable data network which is fully integrated into the Internet, which takes advantage of the bidirectional nature of the telephone system to establish a control path between the head end of the cable data network and the RF modems attached to the CATV cable and to provide an alternate path for data being sent to hosts attached to the RF modem in case of failure of the RF link, which dynamically assigns IP addresses to hosts and link addresses to the RF modems, which employs the RF modems as routers, and which saves IP addresses by reusing the IP addresses of RF modems in the LANs to which they are attached.

While the Detailed Description presents the best mode presently known to the inventors of implementing the cable data network, it will be immediately apparent to those skilled in the relevant arts that the principles used to implement the cable data network may be employed in many other circumstances. For example, the RF link may be replaced by any unidirectional link and the telephone line may be replaced by any bidirectional link that is independent of the RF link. Similarly, the LAN that connects the RF modem to the hosts may be replaced by any medium which provides a bidirectional connection between RF modem and hosts.

Moreover, the techniques described herein for dynamically assigning IP addresses to hosts will work with any kind of logical network addresses, including, for example, virtual circuit numbers. Similarly, the techniques described for dynamically assigning <channel,pipe,linkID>triples to RF modems can be used equally well to dynamically assign any kind of link-level address. The techniques will also work with any technique for subdividing the bandwidth of the unidirectional connection among a number of modems.

Finally, the TCP/IP protocols employed in the preferred embodiment may be replaced by any other protocols which have the same effect. In particular, the DHCP protocol may be replaced by any protocol which can be used for dynamic assignment of logical network addresses, the RIP protocol may be replaced by any protocol which communicates changes in routings to routers, and the SNMP protocol may be replaced by any kind of network management protocol.

The foregoing being the case, the Detailed Description is to be understood as being illustrative and not restrictive and the scope of the invention claimed herein is to be determined not by the Detailed Description but rather by the attached claims as interpreted with the full breadth permitted under the patent laws.

What is claimed is:

1. A method employed in a router which is coupled between a first bidirectional link and a second bidirectional link of dynamically assigning a logical internet protocol network address to a host on the second bidirectional link, the method comprising the steps performed in the router of:

obtaining a set of logical internet protocol network addresses for hosts on the second bidirectional link from a logical address assignment agent that dynamically assigns the set of logical internet protocol network addresses and is accessible via the first bidirectional link, the set of logical internet protocol network addresses being obtained by sending a request to the logical address assignment agent, the request specifying a number of logical internet protocol network addresses to be obtained, the number of logical internet protocol network addresses indicating how many logical internet protocol addresses are to be returned from the logical address assignment agent in the set of logical internet protocol network addresses; and responding to a request from a host for a logical internet protocol network address by assigning one of the set of logical internet protocol network addresses to the host.

2. The method of claim 1, further comprising the steps of:

assigning said host a temporary logical internet protocol network address while said router obtains said set of dynamically assignable logical internet protocol network addresses.

3. The method of claim 1, wherein said first bidirectional link is a Point-to-Point Protocol (PPP) link established between said router and a telephone modem.

4. The method of claim 2, further comprising the steps of:

transferring said host's authentication information via said first bidirectional link to a telephone modem; and transferring said authentication information via said telephone modem to an authorization agent wherein said authorization agent tests the validity of said authentication information.

5. The method of claim 4 wherein said authorization agent executes on a control server.

6. The method of claim 4, wherein said logical address assignment agent executes on a control server, said control server comprising a list of assigned and unassigned logical internet protocol network addresses.

7. The method of claim 4, further comprising the steps of:

assigning dynamically a logical internet protocol network address to said router wherein said router can use TCP/IP protocols;

implementing said logical address assignment agent to respond to a request by said router for said set of dynamically assignable logical internet protocol network addresses; and returning to said router said set of dynamically assignable logical internet protocol network addresses via said telephone modem and said first bidirectional link.

8. The method of claim 7, wherein said set of dynamically assignable logical internet protocol network addresses is at least one logical internet protocol network addresses assignable to any said host coupled to said router via said second bidirectional link that makes at least one request for said at least one logical internet protocol network address.

9. The method of claim 7, further comprising the step of:

responding to a request from said host to said router via said second bidirectional link for a new logical internet protocol network address prior to the expiration of said temporary logical internet protocol network address wherein said host is assigned said new logical internet protocol network address from said set of dynamically assignable logical internet protocol network addresses.

10. The method of claim 9, further comprising the steps of:

transferring digital data received along a unidirectional link coupled to said router along said second bidirectional link to said host wherein said digital data is addressed to said new logical internet protocol network address assigned to said host.

11. The method of claim 1, further comprising the steps of:

implementing a telephone modem coupled to said router via said first bidirectional link; and implementing a telecommunication connection between said router and said telephone modem via said first bidirectional link.

12. The method of claim 11, wherein said telephone modem is communicably coupled to a public switched telephone network.

13. The method of claim 6, wherein said logical address assignment agent includes a dynamic host configuration protocol (DHCP) server.

14. The method of claim 6, further comprising the step of:

implementing an internet protocol (IP) manager on said control server to maintain said list of assigned and unassigned logical internet protocol network addresses.

15. A method employed in a router which is coupled between a first path and a second path of dynamically assigning a logical internet protocol network address to a host on said second path, the method comprising the steps performed in the router of:

obtaining a set of logical internet protocol network addresses for hosts on said second path from a logical address assignment agent that dynamically assigns said set of logical internet protocol network addresses and is accessible via said first path, the set of logical internet protocol network addresses being obtained by sending a request to the logical address assignment agent, the request specifying a number of logical internet protocol network addresses to be obtained, the number of logical internet protocol network addresses indicating how many logical internet protocol addresses are to be returned from the logical address assignment agent in the set of logical internet protocol network addresses; and responding to a request from a host for a logical internet protocol network address by dynamically assigning one of said set of logical internet protocol network addresses to said host.

16. The method of claim 15, further comprising the steps of:

assigning said host a temporary logical internet protocol network address while said router obtains said set of dynamically assignable logical internet protocol network addresses.

17. The method of claim 16, further comprising the step of:

transferring a host's authentication information from said router via said first path to an authentication agent wherein said authentication agent tests the validity of said authentication information.

18. The method of claim 17 wherein said authorization agent executes on a control server.

19. The method of claim 17, wherein said logical address assignment agent executes on a control server, said control server comprising a list of assigned and unassigned logical internet protocol network addresses.

20. The method of claim 17, further comprising the steps of:

assigning dynamically a logical internet protocol network address to said router wherein said router can use TCP/IP protocols;

implementing said logical address assignment agent to respond to a request by said router for said set of dynamically assignable logical internet protocol network addresses; and returning to said router said set of dynamically assignable logical internet protocol network addresses via said first path.

21. The method of claim 20, wherein said set of dynamically assignable logical internet protocol network addresses is at least one logical internet protocol network addresses assignable to any said host coupled to said router via said second path that makes at least one request for said at least one logical internet protocol network address.

22. The method of claim 20, further comprising the step of:
    responding to a request from said host via said second path for a new logical internet protocol network address prior to the expiration of said temporary logical internet protocol network address wherein said host is assigned said new logical internet protocol network address from said set of dynamically assignable logical internet protocol network addresses.

23. The method of claim 22, further comprising the step of:
    transferring digital data received by said router addressed to said new logical internet protocol network address assigned to said host along said second path to said host.

24. The method of claim 19, wherein said logical address assignment agent includes a DHCP server.

25. The method of claim 19, further comprising the step of:
    implementing an IP manager on said control server to maintain said list of assigned and unassigned logical internet protocol network addresses.

26. The method of claim 25, further comprising:
    implementing a simple network management protocol (SNMP) agent to execute on said control server and to assist said IP manager in assigning and deassigning said logical internet protocol network addresses.

27. The method of claim 23, further comprising the steps of:
    detecting when a last host coupled to said router via said second path terminates communication with said router wherein no host is in communication with said router via said second path; and
    terminating all incoming and outgoing communication along said first path wherein said set of dynamically assignable logical internet protocol network addresses are released from assignment to said router and become available for reassignment.

28. A system employed in a router which is coupled between a first path and a second path for dynamically assigning a logical internet protocol network address to a host on the second path, comprising:
    logic configured to obtain a set of dynamically assigned logical internet protocol network addresses for hosts on said second path, the set of logical internet protocol network addresses obtained by sending a request to the logical address assignment agent, the request specifying a number of logical internet protocol network addresses to be obtained, the number of logical internet protocol network addresses indicating how many logical internet protocol addresses are to be returned from the logical address assignment agent in the set of logical internet protocol network addresses;
    a logical address assignment agent that dynamically assigns said set of logical internet protocol network addresses and is accessible via said first path; and
    said router responding to a request from said host for one of said logical internet protocol network address by dynamically assigning one of said set of logical internet protocol network addresses to said host.

29. The system of claim 28, further comprising:
    logic configured to assign a temporary logical internet protocol network address to said host while said router obtains said set of dynamically assignable logical internet protocol network addresses.

30. The system of claim 29, further comprising:
    host authentication information transferred via said first path to an authorization agent, wherein said authorization agent tests the validity of said authentication information.

31. The system of claim 30 wherein said authorization agent executes on a control server.

32. The system of claim 30, wherein said logical address assignment agent executes on a control server, said control server maintaining a list of assigned and unassigned logical internet protocol network addresses.

33. The system of claim 30, further comprising:
    logic configured to dynamically assign a logical internet protocol network address to said router by said logical address assignment wherein said router can use TCP/IP protocols;
    a request to said logical address assignment agent by said router for assignment of said set of dynamically assignable logical internet protocol network addresses; and
    logic configured to receive said set of dynamically assignable logical internet protocol network addresses returned to said router via said first path.

34. The system of claim 33, wherein said set of dynamically assignable logical internet protocol network addresses is at least one logical internet protocol network addresses assignable to any said host coupled to said router via said second path that makes at least one request for said at least one logical internet protocol network address.

35. The system of claim 33, further comprising:
    a request from said host via said second path for a new logical internet protocol network address prior to the expiration of said temporary logical internet protocol network address wherein said host is assigned said new logical internet protocol network address from said set of dynamically assignable logical internet protocol network addresses.

36. The system of claim 35, further comprising:
    digital data received by said router addressed to said new logical internet protocol network assigned to said host wherein said digital data is transferred along said second path to said host.

37. A router which is coupled between a first path and a second path, comprising:
    means for obtaining a set of dynamically assignable logical internet protocol network addresses for hosts on said second path from a logical address assignment agent, the set of logical internet protocol network addresses being obtained by sending a request to the logical address assignment agent, the request specifying a number of logical internet protocol network addresses to be obtained, the number of logical internet protocol network addresses indicating how many logical internet protocol addresses are to be returned from the logical address assignment agent in the set of logical internet protocol network addresses; and
    means for dynamically assigning said host on said second path upon request one of said logical internet protocol network addresses dynamically assigned to said router.

38. The system of claim 32, wherein said logical address assignment agent includes a DHCP server.

39. The system of claim 32, further comprising the step of:
    logic configured to implement an IP manager on said control server to maintain said list of assigned and unassigned logical internet protocol network addresses.

40. The system of claim 39, further comprising:

logic configured to implement an a SNMP agent to execute on said control server and to assist said IP manager in assigning and deassigning said logical internet protocol network addresses.

41. The system of claim 36, further comprising:

logic configured to detect when a last host coupled to said router via said second path terminates communication with said router wherein no host is in communication with said router via said second path; and logic configured to terminate all incoming and outgoing communication along said first path wherein said set of dynamically assignable logical internet protocol network addresses are released from assignment to said router and become available for reassignment.

42. The system of claim 41, wherein said set of dynamically assignable logical internet protocol network addresses are released from assignment to said router by a DHCP message sent to a logical address assignment agent instructing the release.

43. The system of claim 36, further comprising:

logic configured to detect when said router is inactive for a prescribed time; and logic configured to deassign said set of logical internet protocol network addresses from said router and make said set of logical internet protocol network addresses available for reassignment to another router upon request.

44. The system of claim 36, further comprising:

logic configured to monitor the period of time that a logical internet protocol network addresses is assigned to said router; and logic configured to deassign any from said router said logical internet protocol network addresses if said router fails to notify said logical address assignment agent of said router's continued utilization of said logical internet protocol network address within a preset time period wherein said logical internet protocol network address is made available for reassignment to another router upon request.

45. A router coupled between a first link and a second link for dynamically obtaining and assigning a logical internet protocol network address to at least one host on the second link, comprising:

logic configured to dynamically obtain on the first link a set of logical internet protocol network addresses for at least one host on the second link, the set of logical internet protocol network addresses being obtained by sending a request to a logical address assignment agent, the request specifying a number of logical internet protocol network addresses to be obtained, the number of logical internet protocol network addresses indicating how many logical internet protocol addresses are to be returned from the logical address assignment agent in the set of logical internet protocol network addresses; and logic configured to respond to a request from said host and dynamically assign a logical internet protocol address from one of the set of logical internet protocol network addresses to said host on the second link.

46. The router of claim 45, wherein said router only obtains said set of logical internet protocol network addresses after at least one of said hosts makes a request for a logical internet protocol network address.

47. The router of claim 45, wherein said router utilizes DCHP protocol to obtain said set of logical internet protocol network addresses.

48. The router of claim 45, further comprising:

logic configured to assign a temporary logical internet protocol network address to said host while said router obtains said set of dynamically assignable logical internet protocol network addresses.

49. The router of claim 48, further comprising:

a telephone modem coupled to said router via said first link; and a telecommunication connection implemented between said router and said telephone modem via said first link.

50. The router of claim 49, wherein said router and said telephone modem a establish Point-to-Point Protocol (PPP) link.

51. The router of claim 49, further comprising:

host authentication information transmitted via said first link to said telephone modem; and an authorization agent accessible by said telephone modem wherein said authorization agent receives said authentication information from said telephone modem and tests the validity of said authentication information.

52. The router of claim 51, wherein said authorization agent executes on a control server.

53. The router of claim 51, wherein said logical address assignment agent executes on a control server, said control server comprising a list of assigned and unassigned logical internet protocol network addresses.

54. The router of claim 53, wherein said logical address assignment agent includes a DHCP server.

55. The router of claim 53, further comprising the step of:

an IP manager executed on said control server to maintain said list of assigned and unassigned logical internet protocol network addresses.

56. The router of claim 55, further comprising:

a SNMP agent executed on said control server and to assist said IP manager in assigning and deassigning said logical internet protocol network addresses.

57. The router of claim 51, further comprising:

a logical internet protocol network address dynamically assigned to said router by said logical address assignment agent wherein said router can use TCP/IP protocols;

a request to said logical address assignment agent by said router for assignment of said set of dynamically assignable logical internet protocol network addresses; and said set of dynamically assignable logical internet protocol network addresses returned to said router via said telephone modem and said first link.

58. The router of claim 57, wherein said set of dynamically assignable logical internet protocol network addresses is at least one logical internet protocol network addresses assignable to any said host coupled to said router via said second link that makes at least one request for said at least one logical internet protocol network address.

59. The router of claim 57, further comprising:

a request from said host to said router via said second link for a new logical internet protocol network address prior to the expiration of said temporary logical internet protocol network address wherein said host is assigned said new logical internet protocol network address from said set of dynamically assignable logical internet protocol network addresses.

60. The router of claim 59, further comprising:

a unidirectional link coupled to said router; and digital data received by said router along said unidirectional link that is addressed to said new logical internet protocol network address assigned to said host wherein said digital data is transferred along said second link to said host.

61. The router of claim 60, further comprising:
logic configured to detect when a last host coupled to said router via said second path terminates communication with said router wherein no host is in communication with said router via said second path; and
logic configured to terminate communication along said first path wherein said set of dynamically assignable logical internet protocol network addresses are released from assignment to said router and become available for reassignment.

62. The router of claim 61, wherein said set of dynamically assignable logical internet protocol network addresses are released from assignment to said router by a DHCP message sent to said logical address assignment agent instructing the release.

* * * * *

UNITED STATES PATENT AND TRADEMARK OFFICE
CERTIFICATE OF CORRECTION

PATENT NO. : 6,178,455 B1
DATED : January 23, 2001
INVENTOR(S) : SCHUTTE ET AL.

It is certified that error appears in the above-identified patent and that said Letters Patent is hereby corrected as shown below:

Column 2, Line 10, delete "modem" and insert therefore --modern--
Column 3, Line 3, delete "1994," and insert therefore --1994.--
Column 4, Line 55, delete "(datagrans)" and insert therefore --(datagrams)--
Column 10, Lines 50-51, delete "subnetworkmasks" and insert therefore --subnetwork masks--
Column 11, Line 65, delete "Ds" and insert therefore --IDs--
Column 14, Line 47, delete "9220)" and insert therefore --922(j)--
Column 15, Line 43, delete "<channelpipe number, LinkID>" and insert therefore --<channel, pipe number, LinkID>--
Column 15, Line 60, delete "address" and insert therefore --addresses--
Column 16, Line 26, delete "EPA" and insert therefore --IPA--
Column 17, Line 23, delete "EPA" and insert therefore --IPA--
Column 19, Line 34, delete "returns the channel" and insert therefore --returns the <channel--
Column 26, Line 65, delete "logic configured to implement an" and insert therefore --implementing--
Column 27, Line 1, delete "system" and insert therefore --method--
Column 27, Line 2, delete "logic configured to implement an" and insert therefore --implementing--

Signed and Sealed this

Fifteenth Day of May, 2001

*Attest:*

NICHOLAS P. GODICI

*Attesting Officer*  Acting Director of the United States Patent and Trademark Office